United States Patent
Dagdelen Uysal et al.

(10) Patent No.: US 10,509,927 B2
(45) Date of Patent: Dec. 17, 2019

(54) WEARABLE RFID SYSTEM

(71) Applicant: METRC LLC, Lakeland, FL (US)

(72) Inventors: Dilek Dagdelen Uysal, Lakeland, FL (US); Ahmet Erdem Altunbas, Gainesville, FL (US); Jeffrey Lane Wells, Lakeland, FL (US)

(73) Assignee: METRC LLC, Lakeland, FL (US)

( * ) Notice: Subject to any disclaimer, the term of this patent is extended or adjusted under 35 U.S.C. 154(b) by 0 days.

(21) Appl. No.: 14/217,850

(22) Filed: Mar. 18, 2014

(65) Prior Publication Data

US 2014/0197929 A1    Jul. 17, 2014

Related U.S. Application Data

(63) Continuation of application No. 12/765,573, filed on Apr. 22, 2010, now Pat. No. 8,674,810.

(60) Provisional application No. 61/171,516, filed on Apr. 22, 2009, provisional application No. 61/324,044, filed on Apr. 14, 2010.

(51) Int. Cl.
   *G06K 7/10* (2006.01)
   *G06K 7/00* (2006.01)

(52) U.S. Cl.
   CPC ....... *G06K 7/10009* (2013.01); *G06K 7/0008* (2013.01); *G06K 7/10079* (2013.01); *G06K 7/10128* (2013.01); *G06K 7/10396* (2013.01)

(58) Field of Classification Search
   CPC .................. G06K 7/0008; G06K 7/10039
   See application file for complete search history.

(56) References Cited

U.S. PATENT DOCUMENTS

| | | |
|---|---|---|
| 6,523,752 B2 | 2/2003 | Nishitani et al. |
| 7,026,935 B2 | 4/2006 | Diorio et al. |
| 7,079,084 B2 | 7/2006 | Notohara et al. |
| 7,307,523 B2 | 12/2007 | Kister et al. |
| 7,314,177 B2 | 1/2008 | Lapstun et al. |

(Continued)

FOREIGN PATENT DOCUMENTS

| | | |
|---|---|---|
| JP | 2001-233410 | 8/2001 |
| JP | 2002-352200 | 12/2002 |
| WO | WO-2008/070398 | 6/2008 |

OTHER PUBLICATIONS

Kim, I.W., et al., "The Koch Island Fractal Microstrip Patch Antenna," IEEE, Antennas and Propagation Society International Symposium, Jul. 2001, pp. 736-739, vol. 2.

*Primary Examiner* — Vernal U Brown
(74) *Attorney, Agent, or Firm* — Saliwanchik, Lloyd & Eisenschenk

(57) ABSTRACT

Apparatus and methods are provided for automatically interrogating a tagged object using radio frequency identification (RFID) when the object is moved. In one embodiment, a worker is outfitted with a wearable RFID system including an RF antenna, an RFID reader, and a holder to hold the antenna and reader during operation. The system is worn by the worker while the worker moves objects from one place to another. When the worker moves an object with an attached RFID tag, the antenna automatically begins scanning for signals from the object's RFID tag. When a RF signal is received by the antenna, the RFID reader collects the signal and transmits it to a host system which processes the signal to obtain information related to the object to which the RFID tag is attached.

20 Claims, 20 Drawing Sheets

(56) References Cited

U.S. PATENT DOCUMENTS

| | | | |
|---|---|---|---|
| 7,336,174 | B1 | 2/2008 | Maloney |
| 7,504,949 | B1 * | 3/2009 | Rouaix ................ G06Q 10/06 |
| | | | 235/375 |
| 7,507,523 | B2 | 3/2009 | Yamada et al. |
| 7,522,050 | B2 | 4/2009 | Le |
| 7,579,946 | B2 | 8/2009 | Case, Jr. |
| 7,769,542 | B2 | 8/2010 | Calvarese et al. |
| 7,952,464 | B2 | 5/2011 | Nikitin et al. |
| 8,058,995 | B2 | 11/2011 | Barnett et al. |
| 8,674,810 | B2 * | 3/2014 | Uysal et al. ................. 340/10.4 |
| 2001/0052544 | A1 | 12/2001 | Nishitani et al. |
| 2006/0044112 | A1 | 3/2006 | Bridgelall |
| 2006/0082443 | A1 | 4/2006 | Dehaut et al. |
| 2006/0092040 | A1 * | 5/2006 | Fishkin .............. G06K 7/10079 |
| | | | 340/10.1 |
| 2006/0167152 | A1 * | 7/2006 | Thibaut ........................ 524/323 |
| 2007/0040687 | A1 * | 2/2007 | Reynolds ................ G01S 13/74 |
| | | | 340/572.7 |
| 2007/0080930 | A1 | 4/2007 | Logan et al. |
| 2008/0136662 | A1 | 6/2008 | Bellows et al. |
| 2011/0234398 | A1 * | 9/2011 | Romaine ................ G01B 7/003 |
| | | | 340/539.13 |

\* cited by examiner

WEARABLE RFID SYSTEM

CROSS-REFERENCE TO RELATED APPLICATIONS

The present application is a continuation of U.S. patent application Ser. No. 12/765,573, filed Apr. 22, 2010, which claims the benefit of U.S. Provisional Application Ser. No. 61/171,516, filed Apr. 22, 2009 and U.S. Provisional Application Ser. No. 61/324,044, filed Apr. 14, 2010, all of which are hereby incorporated by reference herein in their entirety, including any figures, tables, or drawings.

BACKGROUND OF INVENTION

Radio frequency identification (RFID) technology enables automatic identification of unique items by using radio frequency (RF) signals. A typical RFID system includes a tag, a reader, an antenna, and a host system. The reader gathers information about an object by communicating through the antenna with the tag attached to the object. The host system then processes the data collected by the reader to obtain information related to the tagged object.

RFID systems often have reading or interrogation fields having a wide range which can present a problem of differentiating an individual product or a case that needs to be detected among other tagged items. RFID portals are limited in that they distinguish only the items passing through the portal, for example, a duck door, while reading every other tag in the field. On the other hand, in RFID systems that have shorter or more directed read ranges, such as high frequency (HF) systems or handheld devices, the antenna has to be in very close proximity and almost aimed at a particular tag in order to read it. Having to aim the RFID device undermines at least some of the benefits of using an RFID system. Moreover, the data collected still needs to be confirmed due to the high probability of reading an unwanted tag. These aimed devices can also occupy the user's hands, making handling of items more difficult or time consuming.

Current wearable RFID systems have antenna designs that severely limit their interrogation or read ranges. The limited interrogation or read ranges, sometimes only one to two inches, require that these systems still be "aimed" at the desired tag to ensure interrogation. This aiming can disrupt a worker's normal handling of tagged objects and decrease processing accuracy or efficiency. Initial studies show that aiming can significantly increase the processing time required when handling items.

Accordingly, there is a need for a method and system that allows interrogation of RFID tagged items when the items are handled individually while among other items, such as during typical warehouse or retail store activity of preparing an order, breaking up a pallet or a case, or associating cases to pallets, without disrupting the handling process. Specifically, there is a need for a wearable RFID system with an increased interrogation and read range that does not lose the sought after RFID tag among others within the interrogation field.

BRIEF SUMMARY

In one aspect of an embodiment of the subject invention, a wearable RFID system is provided, including an antenna, an RFID reader, a host system, and a holder for holding at least the antenna and the reader. In specific embodiments, the wearable RFID system also incorporates a transmitting antenna or interrogator in the holder, for production of an interrogation RF signal that creates a response RF signal upon incidence on a RFID tag or transponder. The RFID reader can drive the transmitting antenna or a separate transmitter can be provided. In a specific embodiment, one antenna acts as both the transmitting antenna and the receiving antenna. In alternative embodiments, the transmitting antenna can be separate from the holder, and/or not attached to the wearer of the holder. Similarly, the host system can be located on the holder, worn elsewhere on the user, or located remotely from the user, in which case the RFID reader communicates remotely with the host system. In an embodiment, the RFID reader incorporates at least part of the host system. The antenna receives RF signals from one or more RFID tags. The reader collects the signals from the antenna and the host system processes these signals to retrieve information about the RFID tag.

In another aspect of an embodiment of the subject invention, a method of using the system to identify objects with attached RFID tags is also provided in which the holder is worn by a worker while the worker moves objects from one place to another. When the holder picks up or moves an object with an attached RFID tag, the RFID reader scans signals from the object's RFID tag received by the antenna. The scanning can begin automatically or can be triggered by an input from, for example, the user and/or a sensor. When a RF signal is received by the antenna, the RFID reader collects the signal and transmits it to the host system as described above. The host system then processes the signal to obtain information about the RFID tag. In a specific embodiment, no additional or specific action by the worker is required to initiate interrogation and scanning. Therefore, the worker is able to handle the objects normally without any extraneous movement or time. In fact, in some embodiments of the invention, the worker may not even know that the holder the worker is wearing incorporates an RFID system.

Embodiments of the subject invention offer significant improvement over prior wearable RFID systems in that they do not require that the RF antenna be pointed directly at each item's tag as items are processed. Instead, according to embodiments of the subject invention an RF antenna is positioned so that during normal handling of tagged items the antenna is generally oriented toward the handled item. An increased read range and other enhancements facilitate the reading of the tag without "aiming" or other extraneous motion by the worker. In embodiments of the subject invention, the system is further enhanced by the addition of sensors that indicate when interrogation should be initiated for a particular item or group of items, thus increasing read accuracy and saving battery life. In further embodiments, the RFID system incorporates other identification apparatus, such as a barcode scanner, to corroborate the radio frequency identification of handled items.

It should be noted that this Brief Summary is provided to generally introduce the reader to one or more select concepts described below in the Detailed Disclosure in a simplified form. This Summary is not intended to identify key and/or required features of the claimed subject matter. The invention is defined by the claims below.

DETAILED DISCLOSURE

Figure 1:
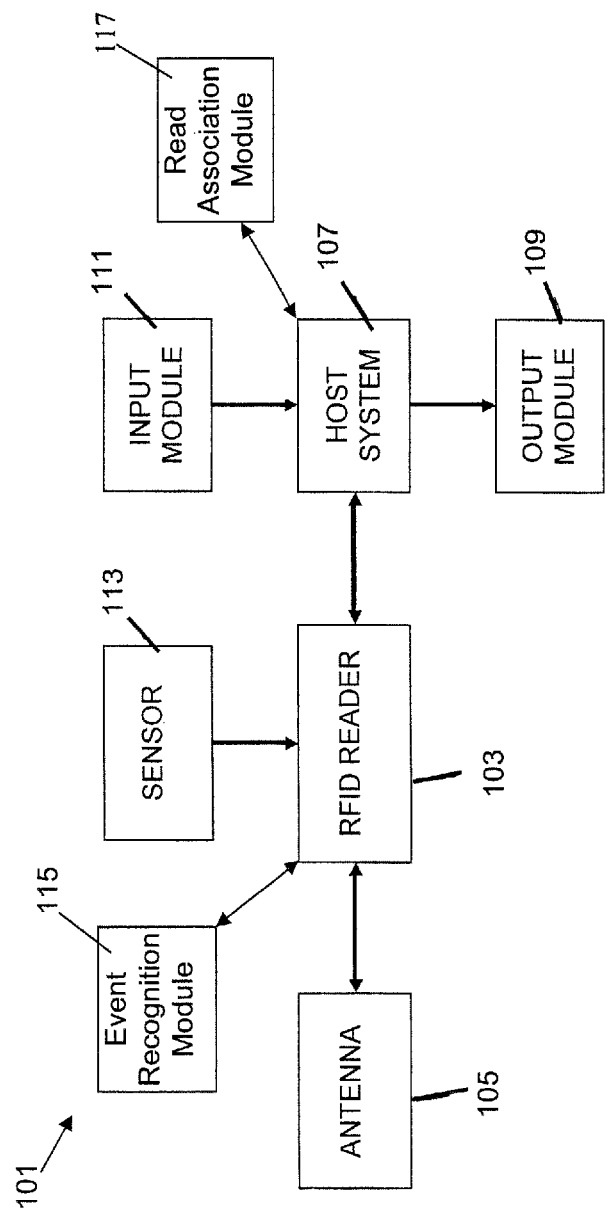
FIG. 1 shows a functional block diagram of a system in accordance with an embodiment of the subject invention.

Embodiments of the present invention include improved systems and methods for radio frequency identification (RFID) using a wearable RFID antenna. In one embodiment of the subject invention, a wearable RFID system is provided, including an antenna, an RFID reader, a host system, and a holder for holding at least the antenna and the reader. In specific embodiments, the wearable RFID system also incorporates a transmitting antenna or interrogator in the holder, for production of an interrogation RF signal that creates a response RF signal upon incidence on a RFID tag or transponder. The RFID reader or host system can drive the transmitting antenna or a separate transmitter can be provided. In a specific embodiment, one antenna acts as both the transmitting antenna and the receiving antenna. In alternative embodiments, the transmitting antenna can be separate from the holder, and/or not attached to the wearer of the holder. Similarly, the host system can be located on the holder, worn elsewhere on the user, or located remotely from the user, in which case the RFID reader communicates remotely with the host system. The antenna receives RF signals from one or more RFID tags. The reader collects the signals from the antenna and the host system processes these signals to retrieve information about the RFID tag.

A method of using the system to identify objects with attached RFID tags is also provided in which the holder is worn by a worker while the worker moves objects from one place to another. When the worker picks up, drops off, or otherwise moves an object with an attached RFID tag, the RFID reader scans signals from the object's RFID tag received by the antenna. The scanning can begin automatically or can be triggered by an input from, for example, the user and/or a sensor. When a RF signal is received by the antenna, the RFID reader collects the signal and transmits it to the host system as described above. The host system then processes the signal to obtain information about the RFID tag. In a specific embodiment, no additional or specific action by the worker is required to initiate interrogation and scanning. Therefore the worker is able to handle the objects normally without any extraneous movement or time. In fact, in some embodiments of the invention, the worker may not even know that the holder the worker is wearing incorporates an RFID system.

In an embodiment of the subject invention, a power output level or other settings for an RFID system are set or adjusted based on input from a user and/or a sensor. In an embodiment, the user selects the power output level or other settings via an input button or other direct control. In an embodiment, the user selects an application or use-case scenario based on the intended use of the RFID system (for example an application can be selected from a menu of possible choices) and appropriate settings are set or adjusted based on the selected use. In an embodiment, the RFID system recognizes a specific application or use-case scenario based on a movement pattern of an object or the user. In an embodiment, the system sets or adjusts the power output level or other settings for the recognized application. In an embodiment, no additional or specific action by the worker is required to initiate such adjustment. Therefore, the worker is able to initiate and change tasks without any extraneous movement or time.

Embodiments of the subject invention offer significant improvement over prior wearable RFID systems in that they do not require that the RF antenna be pointed directly at each item's tag as items are processed. Instead, according to embodiments of the subject invention an RF antenna is positioned so that during normal handling of tagged items the antenna is generally oriented toward the handled item. An increased read range and other enhancements facilitate the reading of the tag without "aiming" or other extraneous motion by the worker. In embodiments of the subject invention, the system is further enhanced by the addition of sensors that indicate when interrogation should be initiated for a particular item or group of items, thus increasing read accuracy and saving battery life. In further embodiments, the RFID system incorporates other identification apparatus, such as a barcode scanner, to corroborate the radio frequency identification of handled items.

In an embodiment of the subject invention, a plurality of antennas is used with an RFID system. In an embodiment, a first antenna of the plurality is a transmitting antenna capable of interrogating RFID tags, and a second antenna of the plurality is a receiving antenna capable of receiving RF signals. In an embodiment, the first antenna can also operate as a receiving antenna. In an embodiment, the second antenna can also operate as a transmitting antenna. In an embodiment both antennas are mono-static used for both transmitting and receiving. In an embodiment, the second antenna is removeably connected to the RFID system such that the system can be used with or without the second antenna. In an embodiment, the second antenna is positioned on a user. In an embodiment, the second antenna is positioned on the user via a harness. In an embodiment, both the first and the second antenna are positioned on the user via the harness. In an embodiment, the second antenna is a handheld antenna. In an embodiment, the second antenna is a directional antenna. In an embodiment, the directional antenna can be oriented by the user to interrogate and/or receive signals from at least one specific RFID tag.

In an embodiment, the first and second antennas are each positioned or otherwise configured to interrogate and/or receive RF signals from different RFID tags. Thus, the first antenna is configured to interrogate and/or receive RF signals from a first type of RFID tags, and the second antenna is configured to interrogate and/or receive RF signals from a second type of RFID tags. For example, the first antenna can be configured to interrogate and/or receive RF signals from object RFID tags attached to objects handled by the user, while the second antenna can be configured to interrogate and/or receive RF signals from location RFID tags positioned at locations passed by the user, or vice versa. In a particular use-case scenario, the first antenna can be positioned on the inside of the user's arm to interrogate and/or receive RF signals from object RFID tags attached to objects handled by the user, while the second antenna can be positioned on the outside of the user's arm to interrogate and/or receive RF signals from location RFID tags passed by the user. Thus, an object carried by the user can be associated with the location of the user by the RFID system. In an embodiment, as discussed above, information from two or more RF signals can be associated when they are received within a certain spatial or temporal proximity. In an embodiment, a read association module such as the read association module is used to associate information received from one or more signals, as discussed below. In alternative embodiments, the first and second antennas can be positioned in other manners appropriate to their use. In embodiments, other settings can also be adjusted based on the use of each antenna.

In an embodiment, a single antenna is used to receive RF signals from different RFID tags. In an embodiment, the single antenna is driven in different ways to receive RF signals from different RFID tags. For example, the orientation of the antenna can be changed, the power output level used to drive the antenna can be changed, or the wavelength used can be changed, among other changes. In an embodiment, the read field of the single antenna is different for different types of RFID tags. For example, the read field can be larger for battery-assisted RFID tags than for fully-passive RFID tags.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

RF Radio Frequency
LF Low Frequency
HF High Frequency
UHF Ultra High Frequency
RFID Radio Frequency Identification The subject matter of the present invention is described with specificity to meet statutory requirements. But this description is not intended to limit the scope of this patent. Rather, the inventors have contemplated that the claimed subject matter might also be embodied in other ways, to include different steps or combinations of steps similar to those described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. In an embodiment, non-transitory media are used.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

A typical RFID system includes a tag, a reader, an antenna, and a host system. The reader gathers information about an object by communicating through the antenna with the tag attached to the object and the host system processes the data collected by the reader. The host system can be housed on the reader or the reader can communicate information to the host system for additional processing.

RFID tags include a memory which typically stores data related to the object. The data stored varies in different applications. For example, in simple applications the data stored may be a single bit indicating the existence of the object. In other applications, a serial or other identification number related to the tag or a tagged object may be stored. In further applications, environmental data may be stored on the tag such as the lowest temperature, highest humidity, or vibrations to which the object was exposed. The data stored on the tag can be read and sometimes written to via an RF antenna. Embodiments of the subject invention can work with any number of RFID tags that are well known in the art.

Typically, an interrogation RF signal is transmitted to begin communication with an RFID tag. The interrogation RF signal causes the tag to become "excited" when the interrogation RF signal is incident on the tag and the interrogation signal's electromagnetic field, magnetic field, or both excites the tag. The tag then produces a response RF signal that encodes data stored on the tag. The response RF signal may be received by the same RF antenna that transmitted the interrogation RF signal or by a different receiving RF antenna. Regardless, an RFID reader collects the response RF signal from the receiving antenna and transmits the signal to a host system that decodes the signal to obtain information about the tag. Different software can then be utilized by the host system to operate different applications. For example, RFID can be used to facilitate identification, authentication, sorting, product/case put away, tracking, inventory management, supply chain management, pricing, quality control (via processing, for example, temperature or humidity data on the tag), and acceptance/declining of the received or shipped products, among other applications. The examples provided herein are merely illustrative. Other applications of RFID are well known in the art and can be used with the subject invention.

The RFID system of the subject invention can be designed to be worn on various parts of the body. For example, the system can be incorporated into a hat, vest, jacket, footwear, or other article of clothing commonly worn by persons handling tagged items. In other embodiments, the system can be incorporated into tools or devices worn or used by workers when handling tagged items, such as a glove, barcode scanner, or weight-belt. In further embodiments the system is incorporated into its own harness or holder which may be worn on various parts of the body, such as the appendages, the torso, or other body parts. To accommodate workers of different sizes, such a holder can feature adjustments used to resize the holder or may be produced in a number of standard sizes (e.g., XS, S, M, L, and XL) or both.

Figure 5A:
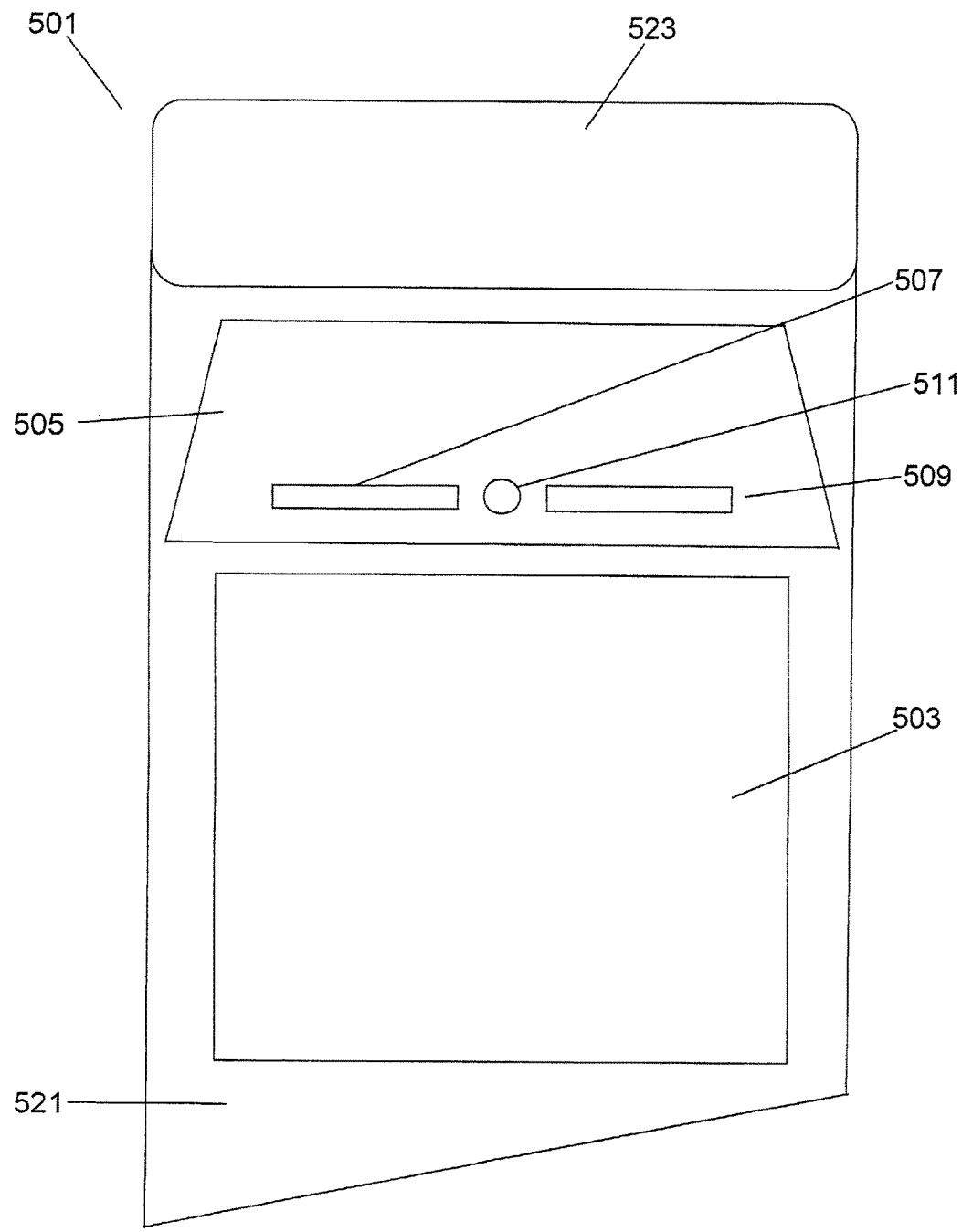
FIGS. 5a and 5b show a sleeve holder with an incorporated reader and flexible dipole antenna in accordance with an embodiment of the subject invention.
Figure 5B:
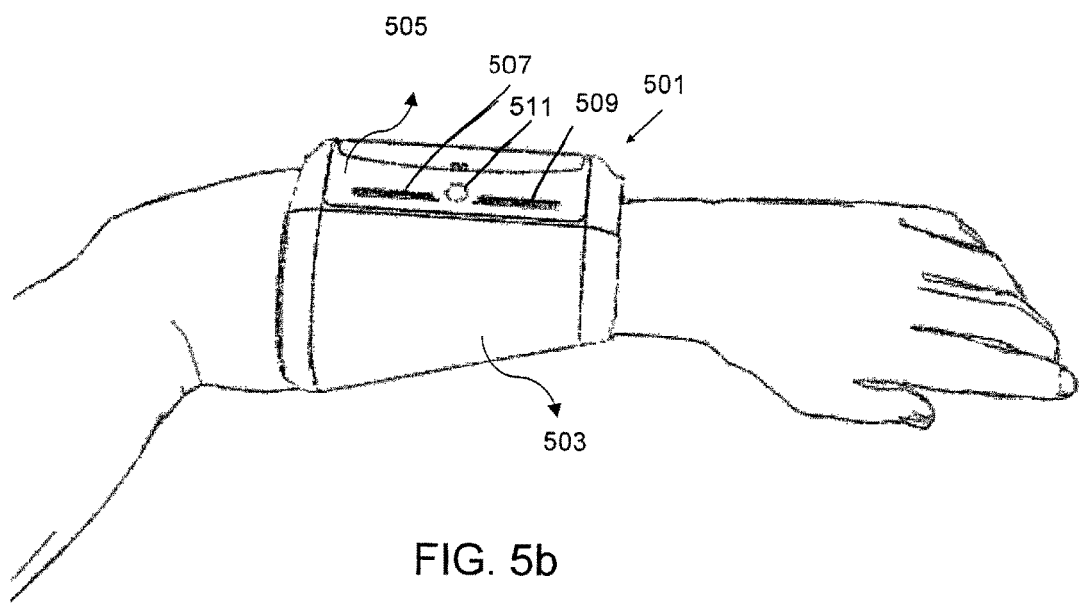

In a particular embodiment, a sleeve holder is provided that can be positioned on an arm or leg of a worker handling tagged items. The sleeve holder can be attached and reattached and sized for different workers. The sleeve holder may be worn for example on the forearm as shown in FIG. 5b. The antenna and reader may be incorporated into the sleeve holder itself or they may be removeably attached to the sleeve holder using hook and loop fasteners, synch straps, buckles, or other fastening or harness mechanisms known in the art.

In a further embodiment, a harness is positioned on the body of the worker and the antenna is positioned on the harness such that during normal handling of tagged items by the worker the antenna is generally oriented toward the item as it is picked up, held, moved, set down, or otherwise handled by the worker. For example, a sleeve holder may be worn on the forearm and the antenna placed on the inside portion of the forearm such that it is generally oriented toward a box as it is picked up and carried by a worker. See FIG. 13. In another embodiment, the harness is incorporated into a pair of shoes and the antenna is positioned on the instep of the shoe such that it faces up toward a box carried by the worker. In yet another embodiment, a holder is incorporated into the front of a vest and the antenna is positioned on the portion of the vest covering the stomach or chest such that it faces outward toward a box carried by the worker. See FIG. 11. In additional embodiments, the holder can be incorporated into a necklace, necktie, shoulder harness, or other article worn about the neck of a worker. In other embodiments, the antenna can be positioned so that it generally oriented toward objects passed by a user. For example, the antenna can be placed on the outside portion of the forearm such that it is generally oriented toward an RFID tag on a doorframe when the doorframe is passed by the user. In another embodiment, the antenna can be placed on the shoulder or head of the user so that it is generally oriented toward a plurality of RFID tags positioned on a ceiling or other overhead surface.

Because the holder is generally meant to be worn by a worker while the worker is moving, the antenna and reader can be powered (or partially powered) by the kinetic energy produced by the movement of the worker. Methods of harnessing kinetic energy produced by a human body and transforming such kinetic energy into electrical energy suitable for powering electronic devices are well known in the art.

FIG. 1 shows a functional block diagram of a system 101 in accordance with an embodiment of the subject invention. This figure merely depicts one example of such a system. Embodiments of the invention may contain additional elements not shown here, may not include all of the elements here presented, or the elements shown may be differently arranged.

In one embodiment of the subject invention, an RFID reader 103 receives a response signal from a receiving antenna 105 and merely transmits that signal on to a host system 107 for further processing. The host system 107 can be housed with the reader 103 or the signal or information related to the signal can be communicated by the reader 103 to the host system 107 for further processing.

In another embodiment of the subject invention, the RFID reader 103 is responsible for driving transmitting and receiving antennas. The transmitting antenna can be used to send interrogation signals as is well known in the art. In some embodiments, the transmitting and receiving antennas are one in the same. In FIG. 1, both antennas are represented by the antenna 105. In a further embodiment, the antenna 105 may be driven by the reader 103 to write information to an RFID tag. In an embodiment, the host system itself or a component of the host system, such as an antenna driving module or an RFID reader, can be used to drive the antennas.

In another embodiment, a plurality of antennas can be used. In an embodiment, a first antenna of the plurality is a transmitting antenna, and a second antenna of the plurality is a receiving antenna. In an embodiment, the first antenna can also operate as a receiving antenna. In an embodiment, the second antenna can also operate as a transmitting antenna. In an embodiment both antennas are mono-static used for both transmitting and receiving. In an embodiment, the second antenna is removeably connected to the system 101 such that the system can be used with or without the second antenna. In an embodiment, the first and second antennas are each positioned or otherwise configured to interrogate and/or receive RF signals from different RFID tags. Thus, the first antenna is configured to interrogate and/or receive RF signals from a first type of RFID tags, and the second antenna is configured to interrogate and/or receive RF signals from a second type of RFID tags. For example, in an embodiment, the first antenna can be configured to interrogate and/or receive RF signals from object RFID tags attached to objects handled by the user, while the second antenna can be configured to interrogate and/or receive RF signals from location RFID tags positioned at locations passed by the user, or vice versa. In another embodiment, the second antenna can be configured to interrogate and/or receive RF signals from container RFID tags positioned on containers used to hold such objects.

In yet another embodiment of the subject invention, the host system 107 decodes response RF signals to obtain information about RFID tags, the objects or locations they are attached to or both. For example, the host system 107 may decode a response RF signal from an RFID tag to obtain data stored on the tag such as a serial number corresponding to a product that the tag is attached to, temperature or other environmental data stored on the tag, or other data useful in various RFID applications.

In a further embodiment of the subject invention, the host system 107 also encodes RF signals used to write data to RFID tags. The RFID reader 103 can then drive the antenna 105 to write such signals to RFID tags. For example, the RFID reader may store environmental information on a tag such as the highest temperature to which the tagged object has been exposed. This information can later be retrieved from the tag as described above and known in the art. For example, the system 101 can be used to read a Gen2 temperature tag and, according to a shelf life model, the host system 107 can then output a message to a user that an associated product is good or bad. In an embodiment, the host system itself or a component of the host system, such as an antenna driving module or an RFID reader, can be used to drive the antennas.

In further embodiments, the host system 107 performs more complex information processing. The host system 107 may comprise a database or other memory for storing data related to tagged items or processing parameters. For example, a serial number obtained from a tag may be looked up in a database to obtain the price of a tagged product or other stored information about the product. Or information from the tag may be stored in the host system's memory for further use. As will be obvious to one skilled in the art, such a memory may be incorporated into the host system 107 or may be accessible via a network.

In an embodiment, the host system 107 includes a read association module 117. In an embodiment, the read association module 117 facilitates associating information decoded from one or more response signals received by the RFID reader 103 with other available information. For example, in an embodiment, the read association module associates a product serial number or other information obtained from an RFID tag with information about the product stored in a database as discussed above. In an embodiment, the module associates information received from a response signal with a particular time or location. In an embodiment, the response signal is associated with the time the signal was received. In an embodiment, the response signal is associated with the location or the RFID reader 103 or antenna 105 at the time the signal was received. In an embodiment, the position of the RFID reader 103 or antenna is triangulated from wireless transmissions of the RFID reader 103 or antenna 105. In an embodiment, information from two or more response signals is associated. In an embodiment, tag IDs and/or other information encoded in the response signals are used to associate the signals. In an embodiment, information from two or more response signals received within a certain distance of each other or within a certain area is associated. The location of a response signal can be determined in various ways as described above. In an embodiment, the order in which two or more response signals are received is used to associate one or more signals with a time, location, each other, or other available information. In an embodiment, the rate at which response signals are received from at least one tag is used to associate the at least one tag with a time, location, each other, or other available information. In an embodiment, information from two or more response signals received within a certain time of each other or within a certain time period are associated. For example, as further discussed below, information from an object RFID tag attached to an object can be associated with information from a location RFID tag attached to a doorway when an object response signal is received from the object RFID tag in close temporal proximity to a location response signal received from the location RFID tag. Thus, information regarding the object can be associated with information regarding the location. Similarly, information about an object can be associated with information received from a container RFID tag attached to a container near the object. In an embodiment, the object is associated with a container when the object is positioned on, in, or near the container. In an embodiment, the object is associated with a container when the object is taken from the container. In an embodiment, read order, read rate, and/or other information are used to differentiate signals received from a plurality of tags in the read field, before an association is made. As is known in the art, the functions of the read association module 117 can be distributed in various ways. For example, all or part of the read association module can be stored and/or executed on the host system 107, the RFID reader 103, or another device in communication with the RFID reader 103.

In a particular embodiment, the host system 107 incorporates an output module 109 to present information to one or more users of the system 101. The output module 109 can present such information using various output devices such as visual displays, audio speakers, printers, or other output devices known in the art. This information may be utilized to confirm correct processing or further direct processing of the tagged items, among other applications. In further embodiments, the host system also incorporates an input module 111 which can utilize various input devices known in the art to facilitate interaction with stored data, writing information to RFID tags, and/or other applications.

As described above, in various embodiments of the subject invention, at least a portion of the host system 107 is incorporated into the RFID reader 103 itself or the RFID reader 103 communicates with the host system via known wireless (e.g., Bluetooth) or wired (e.g., a coaxial or Ethernet cable) communication methods. In a particular embodiment of the invention, Bluetooth is used to communicate information between an RFID reader and a host system and to minimize booting time. In such an embodiment, the Bluetooth unit stays on while the system is in use. In addition to Bluetooth, other communication methods can be used such as GSM/GPRS, Satellite, WIFI, Zigbee, or other wired or wireless communication methods. The examples provided herein are merely illustrative. Other communication methods are well known in the art and can be used with the subject invention.

The host system 107 can be incorporated or removeably attached to one of the holders described herein or can be incorporated or removeably attached to a separate holder worn on the same or a different worker. The host system 107 can also be incorporated into a personal or other computer system such as a desktop or a laptop computer or server.

In a further embodiment of the subject invention, the RFID system 101 is used for item identification and the RFID reader or host system incorporates other identification apparatus, such as a barcode scanner, to corroborate the radio frequency identification of handled items. Collected information may be presented and manipulated on a host system as described above. For example, in an embodiment of the invention, a user can correct inconsistent information received from a plurality of sources via the host system. Identification apparatus can be incorporated into the body of the reader device or host system, or communicate through a wired or wireless connection. For example, a barcode scanner may be connected to the reader via a Universal Serial Bus (USB) Port. Other peripheral devices may also be connected to the RFID reader or host system for operation, processing, storage, or presentation. For example, other input and output devices such as printers, speakers, microphones, keyboards, buttons, touch screens, among other devices, can be incorporated. Input and output modules 111 and 109 may facilitate communication with such devices. Other storage media or devices may also be incorporated. A battery may be incorporated into the RFID reader, an antenna, or other part of the RFID system to provide power to the RFID system. Alternatively, a battery or other power source may be connected to the RFID system using known methods. The examples provided herein are merely illustrative. Other peripheral devices are well known in the art and can be used with the subject invention.

In an embodiment of the subject invention, a sensor 113 is provided that senses a change in a physical environment and communicates an event message to the RFID reader 103. In an embodiment, the sensor 113 instead communicates the event message to the host system 107 which can further process the sensor input and/or communicate the event message to the RFID reader 103. In an embodiment, the sensor 113 transmits information to an event recognition module 115, which processes the sensor information to recognize an event and generate and pass the event message.

In an embodiment, the sensor 113 or event recognition module 115 can initiate transmission of the event message to the RFID reader 103, host system 107, or other system component on recognizing an event. In an embodiment, the RFID reader 103, host system 107, or other system component can periodically poll the sensor 113 or event recognition module 115 for the occurrence of one or more events. Regardless of the chosen implementation, the purpose of the sensor 113 and/or event recognition module 115 is to recognize events and provide corresponding event messages, which can be responses to polling requests, at the next available opportunity (e.g., in response to the next polling request).

The sensor 113 can be any number of sensors known in the art and may sense any number of changes, such as a change in temperature, humidity, lighting, acidity, proximity of an object to a part of the RFID system, presence or movement of an object, issuance of a command including but not limited to the pressing of a button or a voice command. The examples provided herein are merely illustrative. Other sensors are well known in the art and can be used with the subject invention. Various events can be recognized, such as a temperature change, a lighting change, among other changes. In an embodiment, the event recognition module 115 can store information needed to recognize one or more events in a memory, such as time or location information. In an embodiment, an event is recognized when a change does not occur within a certain time period. For example, in an embodiment, the event recognition module 115 generates a no-read event when no RF signals are received by the RFID reader 103 within a certain period of time.

In an embodiment, the change comprises movement of an RFID reader, user, or other object. Various methods are known in the art for detecting motion. For example, gyroscopes or accelerometers can be used to detect motion. In an embodiment, a gyroscope is used to detect a change in orientation of an attached object. In an embodiment, one or more gyroscopes are used to detect a change in orientation in a particular direction. In an embodiment, one or more gyroscopes are used to detect a change in orientation of a particular magnitude. In an embodiment, an accelerometer is used to detect acceleration of an attached object. In an embodiment, the accelerometer detects acceleration in a particular direction. In an embodiment, the accelerometer detects acceleration of a particular magnitude. In an embodiment, a plurality of such accelerometers is used. In an embodiment, a sensor can be used to detect a change in proximity of two or more objects, and a movement is implied from the change in proximity. In an embodiment, a light sensor is used to detect a change in lighting, and a movement is implied from the change in lighting. In an embodiment, one or more images of the physical environment are taken and the images are processed to detect a movement. In an embodiment, optical flow registration or other known techniques are used to detect, track, or measure movement depicted in a plurality of images of the physical environment. In an embodiment, a strain gauge can be used to detect displacement or deformation of an object. Other methods known in the art for detecting, tracking, or measuring motion can also be used with the subject invention. In an embodiment, the functions of detecting, tracking, or measuring movement can be housed in the event recognition module 115.

In a particular embodiment, the change comprises the recognition of a particular motion pattern exhibited by the RFID reader, the user, or other object. Various methods are known in the art for recognizing motion patterns associated with a particular movement, such as a human body movement. In an embodiment of the invention, an indicative movement pattern is determined during a training period wherein the movement pattern is indicated by a human being. In an embodiment, the movement pattern is repeatedly indicated. In a further embodiment, the indicative movement pattern is predetermined and loaded into the sensing device or event recognition module. In an embodiment, a separate movement pattern is trained for each user. In an embodiment, the determined movement pattern is recognized based on one or more detected movements of the object.

In an embodiment, a movement pattern is defined as a plurality of accelerations or other movements. In an embodiment, a constant movement in a particular direction for a particular distance or time is considered. Such movements can be detected, tracked, and/or measured using various methods, as described above. In an embodiment, the order or sequence of one or more of the plurality of movements is significant for determining and/or recognizing the movement pattern. In an embodiment, the direction or magnitude of one or more movements is significant. In an embodiment, the absolute or relative timing of one or more movements is significant.

In an embodiment, an indicative movement pattern is determined by storing the timing, order, magnitude, direction, and/or other measurements of the plurality of movements. For example, a wave could be stored as an acceleration of a hand in a first direction, a constant movement of the hand for a first distance or time, an acceleration of a hand in a second direction opposite to the first direction, followed by a constant movement of the hand for a second distance or time. In an embodiment, the wave could also incorporate an angular acceleration of the hand, i.e., where the hand is twisted at the wrist as part of the wave. In an embodiment, the movement pattern is performed by a subject. In a further embodiment, the subject or another person can indicate the beginning or ending of the movement pattern to the system. In an embodiment, the indicative movement pattern is repeated in order to hone the pattern. For example, on repetition an acceptable range for the magnitudes of distance or time can be determined, or a degree of tolerance for the change in direction can be determined, i.e., the second direction of the wave may not be precisely opposed to the first direction. In an embodiment, the indicative movement pattern can be performed by a plurality of subjects. In an embodiment, a movement pattern can be stored for each subject and/or repetition. In an embodiment, the movement pattern of each subject and/or repetition can be contrasted to determine acceptable ranges or tolerances. In an embodiment, the movement pattern of each subject and/or repetition can be compared to eliminate spurious movements.

In an embodiment, various classification techniques can be used to determine or refine the movement pattern. In an embodiment, a supervised classification technique is used wherein a machine learning technique learns a function for classification from training data, which includes measurements upon which to base the classification (inputs) paired with their corresponding classes (outputs). In an embodiment, various measurements of the plurality of movements are the inputs and one or more movement patterns to be recognized are the outputs or classes. Various learning techniques can be used, such as a naïve Bayes' classifier and a random forests classifier. The naive Bayes' classifier is based on Bayes' theorem and makes strong independence assumptions about the inputs. A nave Bayes classifier also assumes that all the inputs are equally powerful in their ability to distinguish between classes. In an embodiment, random forests can produce an accurate classifier because of its ability to estimate the importance of variables in the classification (i.e., all inputs are not thought to be equally important as in the naive Bayes' classifier). As further discussed below, a plurality of detected movements can then be classified as one or more recognized movement patterns when there is good agreement between measurements of the plurality of detected movements and the one or more recognized movement patterns.

In an embodiment, a movement pattern is recognized by comparing or correlating the timing, order, magnitude, direction, and/or other measurements of a plurality of detected movements to the stored movement pattern. In an embodiment, a classification technique is used as discussed above. In an embodiment, the stored movement pattern of a subject is compared to movement of the subject in order to recognize the movement pattern. In an embodiment, the stored movement pattern of a subject is compared to movement of a different subject. In an embodiment, a movement pattern developed from movements of a plurality of subjects is compared to movement of a subject in the plurality. In an embodiment, the movement pattern developed from the movements of the plurality of subjects is compared to movement of a subject outside the plurality. In an embodiment, non-linear statistical data modeling algorithms, such as Artificial Neural Networks, are used for movement pattern determination or recognition.

In an embodiment, the functions of determining or recognizing indicative movement patterns can be housed in the event recognition module 115. In an embodiment, the event recognition module 115 is or includes a movement pattern recognition module (not shown). The event recognition module 115 and/or the movement pattern recognition module can be housed in the host system 107, in the sensor 113, in the RFID reader 103, or on another network accessible device, as discussed above.

On receiving the event message, the RFID reader 103 or host system 107 may take various actions. In one embodiment of the invention, on receiving a triggering message the RFID reader 103 drives the antenna 105 to produce an interrogation signal. In an embodiment, the host system itself or a component of the host system, such as an antenna driving module or an RFID reader, can be used to drive the antennas. In a further embodiment of the invention, if no tag is read (i.e., no response signal is received) during a particular time period the RFID reader 103 switches to a "standby" mode in which no interrogation or scanning is attempted. When the triggering message is received, the RFID reader 103 exits the standby mode and begins scanning again for response signals. These embodiments, may decrease power consumption and extend battery runtime. In yet another embodiment of the invention, on receiving the event message the RFID reader 103 or other system component drives the antenna 105 to produce a write RF signal that writes data to one or more writable RFID tags. This embodiment has many useful applications. For example, the reader may rewrite the tags of the perishable items indicating their predicted shelf life with the information gathered from temperature tracking RFID tags. In another embodiment, the sensor 113 may be configured to produce an event message when the room temperature reaches a dangerous level. The RFID reader 103 can then produce a write RF signal to indicate this information on writable RFID tags attached to perishable items. The examples provided herein are merely illustrative. Other applications will be obvious to those trained in the art. In an embodiment, on receiving a particular event message, the system 101 sets or adjusts one more system settings as further discussed below.

In another embodiment of the invention, a read indicator is provided that indicates when an RFID tag is read by the system 101. The indicator can take various forms including but not limited to a light, a flashing light, a sound, vibration, or other haptic effect, a visual display, among other indications. Such an indicator provides a quick confirmation for the user that the reader 103 is working and reading a tag. The indicator can also be used as a warning signal when it is coupled with a sensor. For example if a sensor, such as a proximity sensor, detects a package in front of the user and no tag is being read, a flashing light or sound can alert the user to the apparent problem.

In yet another embodiment of the invention, the RFID system 101 differentiates a desired tag or tags from other tags within the read range of a receiving antenna. For example, in a particular timeframe, an RFID reader may receive response RF signals from a plurality of RF tags. The RFID system 101 selects a subset of these tags as being of interest to the particular application and processes the corresponding RF signals accordingly. The other RF signals can then be processed differently, stored for later processing, or discarded entirely. Various selection algorithms may be used. Selection can be performed based on various information, including but not limited to, tag type, tag IDs or other information encoded on or related to the tags; signal wavelength, signal strength, and other signal properties; read order, read rate, read time, and read location; among other available information. Selection criteria can be combined to refine selection results. In an embodiment, the signal strength of the response RF signals are used to suggest which of the tags are closest to the receiving antenna. In an embodiment, one or more tags having the highest read rates are selected. In an embodiment, the host system 107 ignores response RF signals until it receives an RF signal comprising a tag ID matching the ID of tag attached to the package being handled. Also, movement pattern recognition algorithms discussed above can also be used in tag differentiation by determining package handling movements. In a further embodiment, a sensor is incorporated as discussed above to narrow the timeframe in which RF signals are read. This embodiment not only saves energy, but also helps decrease the number of response RF signals the system must differentiate. The examples provided herein are merely illustrative. Furthermore, the data from these embodiments, such as the RF signal strength or reader output can be analyzed mathematically to carry out the differentiation between tags using machine learning techniques with various complexities ranging from simple Wiener filtering to more complex neural network approach. Other selection algorithms maybe used with the subject invention.

Embodiments of the subject invention may use one or more antennas or antenna arrays for transmitting and receiving magnetic or electromagnetic signals. Such antennas can be incorporated into the same housing as an RFID reader such as a rigid or flexible compartment. Antennas can also be connected to an RFID reader using a coaxial cable or other connection technology known in the art. Elastic straps may be used to hide a cable from the user and for safety and esthetic concerns. Instead of elastic straps, adjustable or plastic straps may be used. The RFID reader or other system component may drive the antennas to produce or receive magnetic or electromagnetic signals at any number of frequencies including but not limited to LF, HF, UHF, and Microwave frequencies. The signals sent or received may be encoded using any number of known modulation methods including but not limited to AM, SSB, FM, PM, SM, OOK, FSK, ASK, PSK, QAM, MSK, CPM, PPM, TCM, OFDM, FHSS, and DSSS. The examples provided herein are merely illustrative. Other signal passing and encoding methods may be used with the subject invention.

Figure 4:
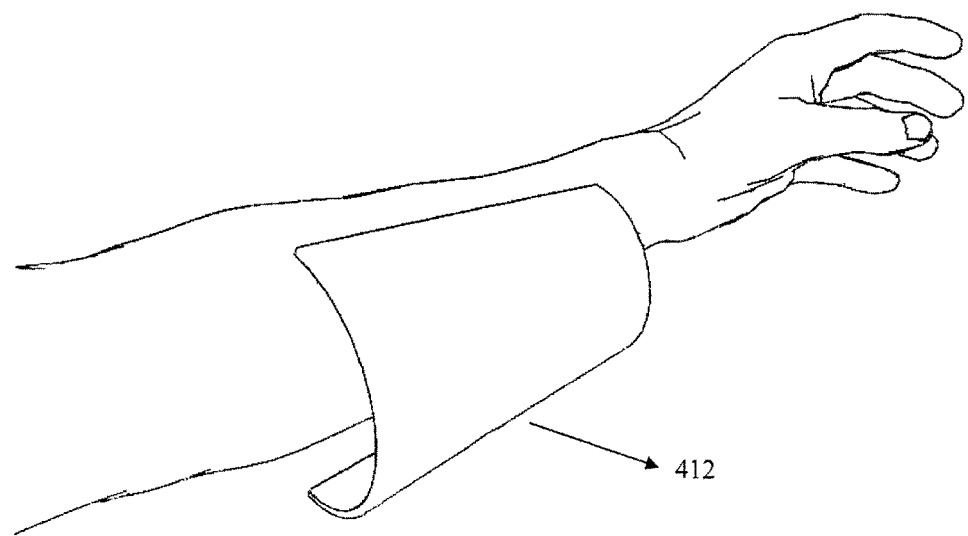
FIG. 4 shows a conformal antenna designed to conform to a human forearm in accordance with an embodiment of the subject invention.
Figure 6:
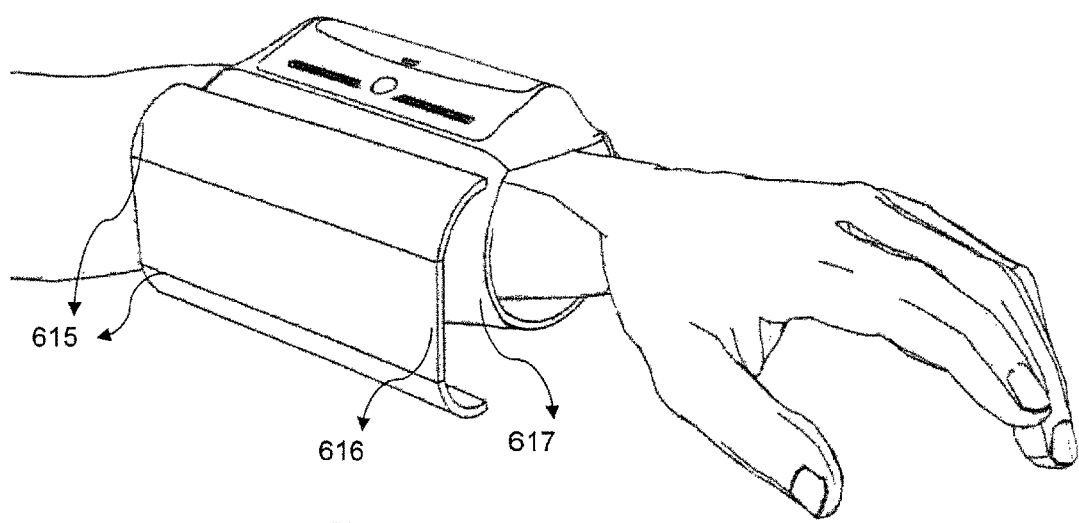
FIG. 6 shows a sleeve holder with an incorporated reader and semi-flexible dipole antenna in accordance with an embodiment of the subject invention.
Figure 7:
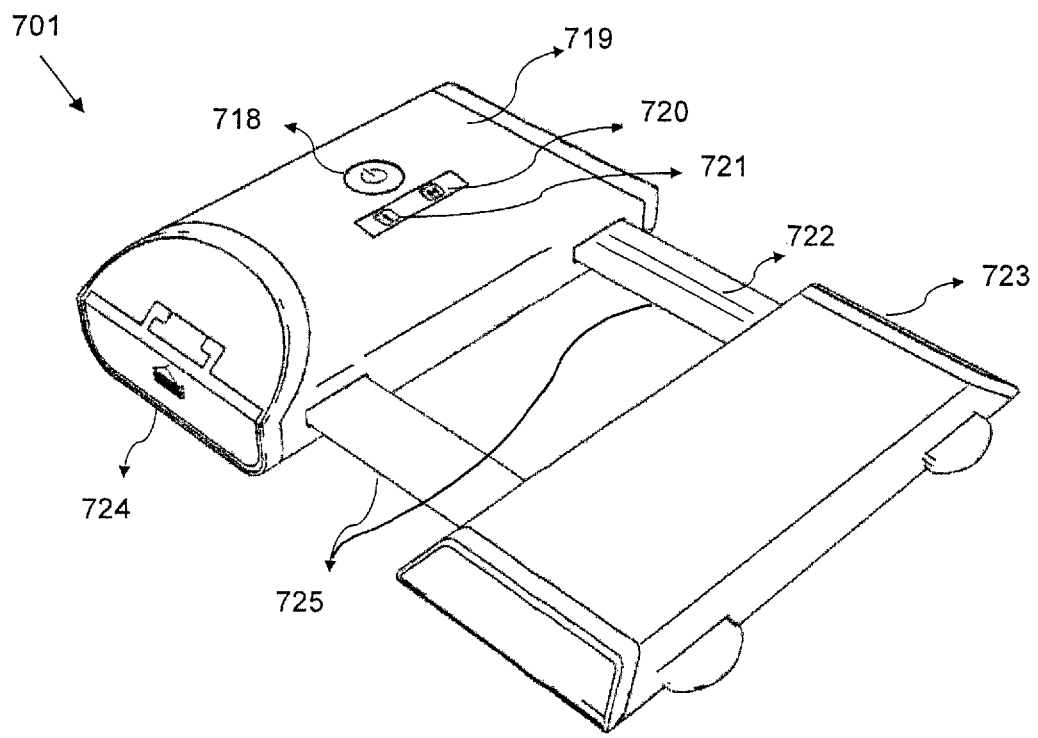
FIG. 7 shows a rigid dipole antenna attached to a reader in accordance with an embodiment of the subject invention.

Embodiments of the subject invention may utilize a variety of antenna designs, including but not limited to patch and dipole antenna designs. The antennas can be flexible, semi-flexible, or rigid depending on the dielectric constant and thickness of the material employed. In one embodiment, a semi-flexible antenna is used which can be bent and then retains its shape. For example, FIG. 4 depicts a conformal antenna 412 designed to conform to a human forearm in accordance with an embodiment of the subject invention. FIG. 5*a* includes a flexible dipole antenna 503 incorporated into a sleeve holder 501 in accordance with an embodiment of the subject invention. FIG. 6 shows semi-flexible dipole antenna comprising a rigid portion 616 bound to a flexible substrate 615 used to attach the antenna to a sleeve holder 617. FIG. 7 shows a rigid dipole antenna with a rigid housing 723 attached to an RFID reader 719 in accordance with another embodiment of the subject invention.

The antennas can be linear polarized or circularly polarized. In one embodiment, linear polarization is used to provide a more directional and powerful signal when the orientation of the tag to be read can be predicted.

Fractal Patch Antennas are known in the art, see I. Kim, T. Yoo, J. Yook, H. Park, "The Koch Island Fractal Patch Antenna" IEEE, Antennas and Propagation Society International Symposium, 2001 volume 2 pg: 736-739, July 2001, and can be employed in embodiments of the subject invention. Fractal microstrip patch antennas use the space filling properties of fractal geometries on existing microstrip square patch antennas. By using fractal patterns, lower resonant frequencies can be achieved using the same patch size. This allows the same resonant frequency to be produced using a smaller antenna footprint, thus enabling an antenna that can be workably positioned on various parts of the human body. For example, here are measurements, in millimeters (mm), for various microstrip patch antennas produced which all resonate at 915 MHz:

|  | IF = 0.2 | Area (mm$^2$) | Size (%) | IF = 0.25 | Area (mm$^2$) | Size (%) |
| --- | --- | --- | --- | --- | --- | --- |
| Square patch | 76 × 76 | 5776 | 100.00 | 76 × 76 | 5776 | 100.00 |
| Fractal 1st iteration | 63 × 63 | 3969 | 68.72 | 57.8 × 57.8 | 3340.84 | 57.84 |
| Fractal 2nd iteration | 60.6 × 60.6 | 3672.36 | 63.58 | 51 × 51 | 2601 | 45.03 |
| Fractal 3rd iteration | 60 × 60 | 3600 | 62.33 | 50 × 50 | 2500 | 43.28 |

As you can see, the area of a patch antenna can be reduced to 43% of its square patch size with the third iteration using iteration factor: 0.25. Here are some additional examples of resonant frequencies and sizes achieved using antenna materials with different dielectric constants ($\varepsilon r$=4.6 or $\varepsilon r$=10.2) and square and fractal patch designs:

| Er: 4.6 h: 1.57 | Resonant Frequency (MHz) | | 915 MHZ Resonant Patch l/w (mm) | |
| --- | --- | --- | --- | --- |
| p/l: 76.27 | IF: 02 | IF: 0.25 | IF: 02 | IF: 0.25 |
| Square patch | 915 | 915 | 76.27 | 76.27 |
| Fractal 1$^{st}$ iteration | 762 | 682 | 63 | 57.8 |
| Fractal 2nd iteration | 726 | 635 | 60.6 | 51 |
| Fractal 3rd iteration | 721 | 620 | 60 | 50 |

| Er: 10.2 h: 1.49 | Resonant Frequency (MHz) | | 915 MHZ Resonant Patch l/w (mm) | |
| --- | --- | --- | --- | --- |
| p/l: 51.35 | IF: 02 | IF: 0.25 | IF: 02 | IF: 0.25 |
| Square patch | 915 | 915 | 51.35 | 51.35 |
| Fractal 1$^{st}$ iteration | 719 | 618 | 42.5 | 37.5 |
| Fractal 2nd iteration | 695 | 580 | 40.5 | 34 |
| Fractal 3rd iteration | 687 | 566 | 39.9 | 33 |

As you can see, the resonant frequency of the antenna reduces with higher iteration and iteration factors.

In a particular embodiment of the invention, a fractal microstrip patch antenna is constructed using an AD1000 substrate with a dielectric constant of 10.2. A 1st iteration fractal pattern using iteration factor 0.20 is cut into a 42.5×42.5 mm patch with a thickness of 1.49 mm producing a resonate frequency of 915 MHZ. In addition to the radiating patch, the antenna includes a ground plate of size 80×80 mm and an antenna connector. In this embodiment, a 50 ohm coaxial cable is used to connect the antenna to an RFID reader, but other connection technology may be used as discussed above.

Figure 2A:
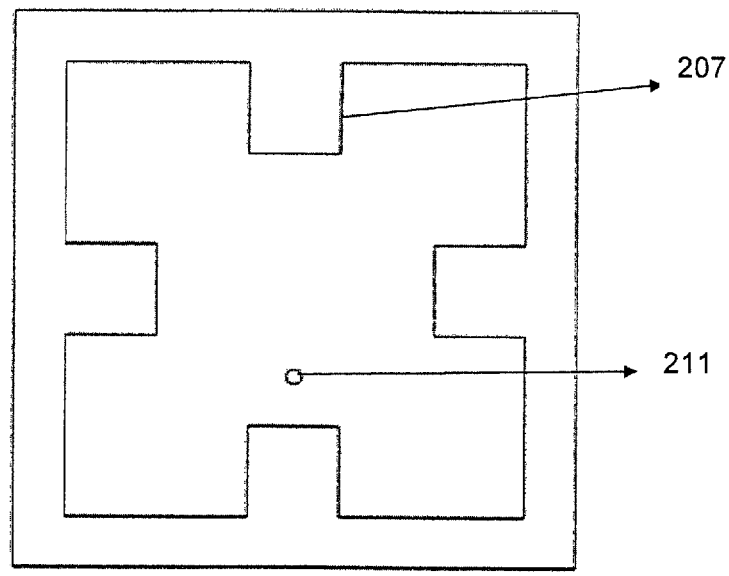
FIGS. 2a and 2b show fractal patch antennas in accordance with an embodiment of the subject invention.
Figure 2B:
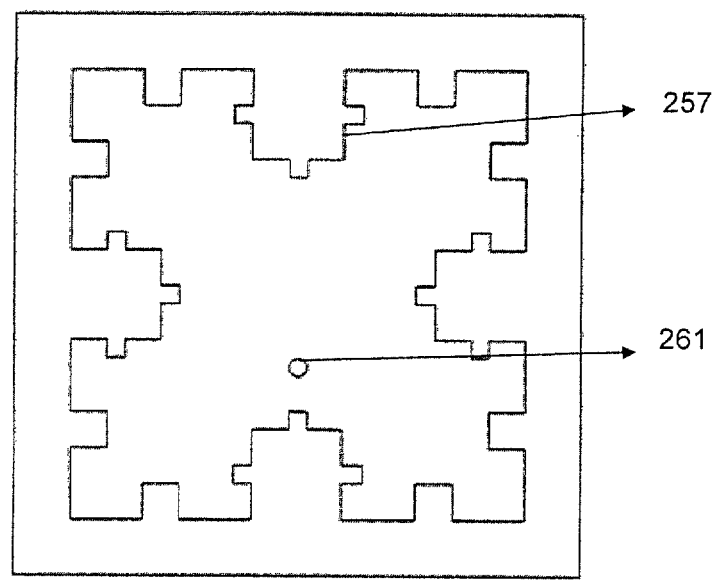

FIG. 2a shows a first iteration fractal patch antenna with a 0.2 iteration factor 207, while FIG. 2b shows a second iteration fractal patch antenna with a 0.2 iteration factor 257 in accordance with particular embodiments of the subject invention. FIGS. 2a and 2b also show antenna connector or feeding points 211 and 261 for connecting the antennas to RFID readers. Although the examples given here are based on a square patch, designs based on other shapes may be used with the subject invention.

Using different antenna designs and power outputs, different read and interrogation ranges and patterns can be produced. Different read and interrogation ranges will be optimal for different applications of the subject invention. For example, a close proximity range would excite and/or read signals from fewer RFID tags. This range would therefore facilitate finding a single tag or a small subset of tags closer to an antenna. This range might be useful for reading tags during handling of individually tagged objects, among other applications. As discussed above, various selection algorithms can be combined with a close proximity range or can be separately employed to select a subset of tags which are important for the particular application. A mid proximity range would be useful for applications where tagged objects are further apart or where it is advantageous to read a larger subset of tagged objects at one time. This range might be useful for sorting of tagged or building orders, among other applications. A large proximity range would be useful for still other applications. This range would be useful where tag selection is performed after tags are excited or read or where all tags in a large area are to be read at one time. This range might be useful for inventory control or inventory of an entire warehouse of tagged objects, among other applications. The ranges may overlap. The ranges can also be optimized depending on the band and wavelength of the radio frequency used or the type of RFID tag to be read. In some applications, a close proximity range may range from zero to about 40 to 60 centimeters, a mid proximity range may range from zero to about 6 meters, while a large proximity range may range from zero to about 30 meters. Ranges over 30 meters may be useful for some applications. A range up to 100 meters may also be useful. In an embodiment, as further discussed below, the power output or other configuration settings of an RFID system can be set or adjusted based on the intended application of the system.

Figure 3A:
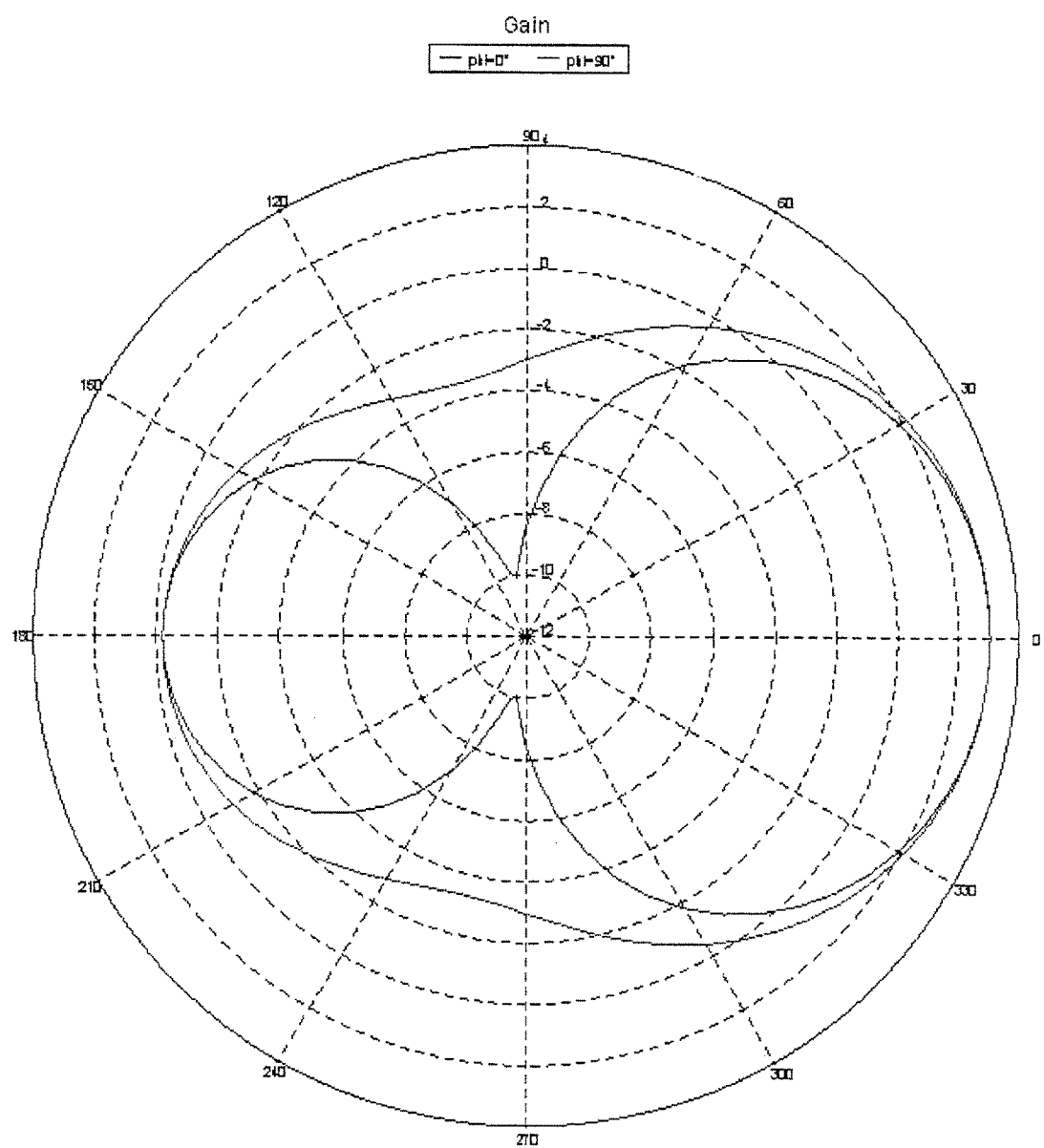
FIGS. 3a and 3b show the radiation pattern of an antenna in accordance with an embodiment of the subject invention.
Figure 3B:
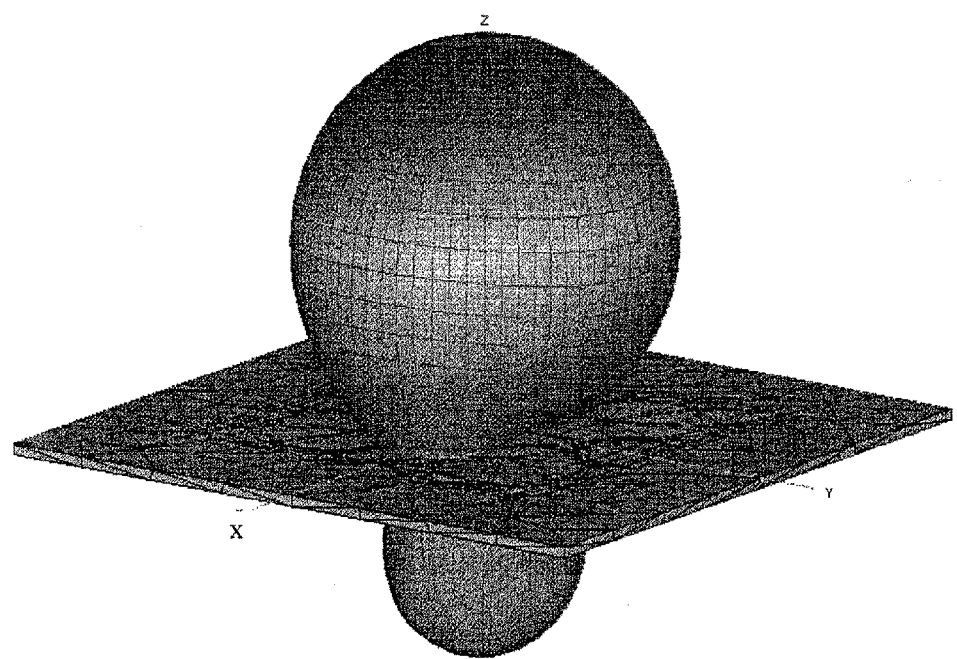

In a particular embodiment, a 20-30 centimeter range is achieved using a fractal micro patch antenna at 20 dBm output power. FIGS. 3a and 3b show an example of the radiation pattern produced by such an antenna. FIG. 3a is a polar coordinate graph and FIG. 3b is a three-dimensional graph of the radiation pattern. As shown, this fractal patch antenna produces a main lope normal to the patch surface and side lopes at the back and sides. In embodiments of the subject invention, an array of antennas is used to create a main lope having an angle to the normal of the radiating patch. This design may be used to direct the radiation pattern toward an object held by a user wearing the antenna. With greater output power and different antenna designs a read range of up to 3-4 meters can be produced. The examples provided herein are merely illustrative. Other antenna designs may be used with the subject invention.

Various holders or harnesses may be used with embodiments of the subject invention in order to position antennas, RFID readers, or host systems on human users. In one embodiment, an antenna, RFID reader, and host system are all positioned on a single holder. In another embodiment, these elements are positioned on different holders or locations and communicate through wired or wireless connections. In a further embodiment of the invention, these elements may be removeably attached to a holder so that they can be removed or repositioned. In other embodiments, the holders may incorporate adjustments used to resize the holder or the holders may be produced in a number of standard sizes (e.g., XS, S, M, L, and XL) or both.

RFID readers and/or host systems can be positioned on a holder or holders so that any user interface and display is visible and accessible to the user. In embodiments of the invention, this is achieved by positioning the element(s) at various locations along the outside of the arm, including but not limited to the upper arm, forearm, wrist, or back of the hand, so that the display and interface are visible and accessible with the other hand when the arm is held up and across the torso. See, for example, FIG. 14 in which a host system 1407 is positioned on the upper arm of a user. In further embodiments, the display and interface may be turned or tilted on the holder to increase visibility and accessibility. The holder may be designed to be worn on either arm or left- and right-handed holders may be produced so that a user can wear the holder on the user's non-dominate arm while accessing controls with the user's dominate hand. Other ergonomic designs are possible and will be obvious to those skilled in the art.

Figure 13:
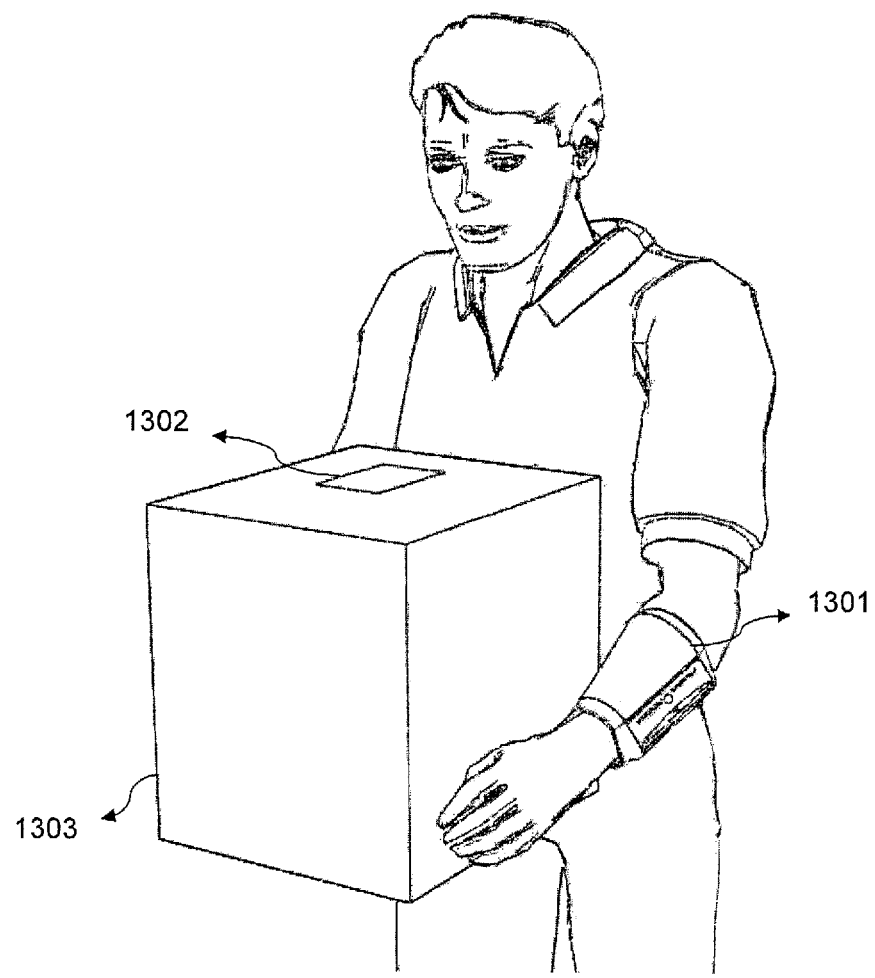
FIG. 13 depicts a method of using an embodiment of the subject invention.

Antennas can be positioned on a holder or holders so that antenna radiation is generally directed away from a user and towards an RFID tag or tagged object in close proximity to the user. In an embodiment, an antenna is positioned on a holder so that antenna radiation is generally directed towards a tagged object directly in front of a user wearing the holder. In another embodiment, an antenna is positioned on a holder so that antenna radiation is generally directed towards a tagged object held by a user wearing the holder. In embodiments, the antenna is placed on the inside of the forearm or hand of the user so that antenna radiation is generally directed toward an item held by the user. For example, FIGS. 5a and 5b show a sleeve 501 which incorporates a flexible antenna 503 and an RFID reader 505. As shown in FIG. 5b, the sleeve 501 can be positioned on a human forearm such that the antenna portion 503 is disposed on the inside of the forearm. In FIG. 13, a wearable RFID system 1301 is positioned on the forearm of a user carrying a package 1303 with an attached RFID tag 1302. As discussed further below, the wearable RFID system 1301 may take many forms including, but not limited to, the sleeve 501 with incorporated antenna 503 and RFID reader 505. As shown in FIG. 13, in this arrangement the radiation generated by the antenna 503 is generally directed toward the package 1303 when the package 1303 is held by the user.

As shown, the RFID reader 505 comprises two status lights 507 and 509. These status lights can be used to present various pieces of information to a user. For example, the status lights may indicate that the RFID reader 505 is: on; receiving RF signals; sending RF signals; in standby mode; linked to a Bluetooth device; communicating with a Bluetooth device; low on batteries; among other pieces of information. In a particular embodiment, the status light 507 blinks when a response RF signal is received by the RFID reader 505. In a further embodiment, the status light 509 blinks when a response RF signal is not received during a particular timeframe, such as within about one second of when such an RF signal was expected. Additional status indicators or other output devices may be used with the subject invention.

The RFID reader 505 also comprises a control 511. The control 511 may comprise a button, switch, knob, or other control device known in the art. The control may be used for various purposes. For example, the control may function as: an on/off switch; an interrogate now switch (directing the reader 505 to drive the antenna 503 to produce an interrogation RF signal); a scan now switch (directing the reader 505 to drive the antenna 503 to scan for a response RF signal); a standby switch (directing the reader 505 to enter or exit a standby mode); among other functions. Additional controls or other input devices may be used with the subject invention.

In embodiments of the subject invention, the holder may comprise hook and loop fasteners, elastic cords, synch straps, or other fastening mechanisms known in the art. Such fasteners maybe used to removeably attach the holder to a wearer, to attach other system components (such as an antenna, RFID reader, or host system) to the holder, or both. The embodiment of FIG. 5a includes hook and loop fasteners attached to the underside of end flap 521 and the top side of end flap 523. These hook and loop fasteners mesh to removeably attach the sleeve 501 to a wearer as shown in FIG. 5b.

FIG. 7 shows an RFID system 701 in accordance with an embodiment of the subject invention. This figure merely depicts one example of such a system. Embodiments of the invention may contain additional elements not shown here or may not include all of the elements here presented. Those elements presented here may be differently arranged in alternative embodiments of the invention.

As shown, the RFID system 701 comprises a rigid dipole antenna 723 attached to an RFID reader 719. The RFID reader 719 includes a power button 718. This button 718 can be used to power up the reader unit 719 to initiate scanning for RF signals. The same button can be used to turn off the reader unit 719 when it is not in use. In a further embodiment, the RFID reader 719 comprises additional controls and/or input devices such as those the controls and input devices discussed above in relation to the RFID reader 505.

Also shown are a tag reading light indicator 720 and a Bluetooth light indicator 721. These status indicators each provide important information to users of the RFID system 701. The tag reading light indicator 720 indicates the receipt of an RF signal by the RFID reader 719. The light 720 may flash or otherwise change to indicate such receipt. The Bluetooth light indicator 721 can indicate the transmission of a Bluetooth message between the RFID reader 719 and a host system (not shown). The RFID reader 719 can transmit a received RF signal to a host system via a Bluetooth message. A host system can use a Bluetooth message to transmit a write RF signal to the RFID reader 719. The RFID reader 719 or other system component can then drive antenna 723 or another antenna to transmit the write RF signal to a writable RFID tag (not shown). Bluetooth, or another communication protocol, may be used to pass other types of messages between the RFID reader 719 and one or more host systems. The light 721 may flash or otherwise change to indicate that the RFID reader 719 is sending or receiving such messages. For example, the light 721 may use one color to indicate the receiving of a message and another color to indicate sending of such a message. In a further embodiment, different colors are used to indicate different types of messages. In a further embodiment, the RFID reader 719 comprises additional status indicators such as those indicators discussed above in relation to status lights 507 and 509.

Also shown is battery port 724. In this embodiment, a battery slides into battery port 724 that provides power to the reader unit 719 and antenna unit 723. Such a battery can be removed to be charged and replaced. In an alternative embodiment, the battery is charged within the reader unit. An ac adapter port may also be provided to provide power to the system 701. In a further embodiment, the battery may be charged by kinetic energy generated by a wearer of such a system. As discussed above, other peripheral devices may be connected to and used with such a system.

In the embodiment shown in FIG. 7, a coaxial cable 722 is used to operably connect the reader unit 719 to the antenna unit 723. RF signals can thereby be passed between the reader unit 719 and the antenna 723, in either direction. Various other connection technologies are known in the art and can be used with the subject invention to communicate signals between the reader unit and the antenna. Here, the reader unit 719 and the antenna unit 723 are also physically connected by connection straps 725. The connection straps 725 are composed of a flexible material to allow the distance between the reader unit 719 and antenna unit 723 to change somewhat. As discussed further below, this flexibility allows the system 701, which is composed of rigid components, to be worn and accommodate movement by users of various sizes. In a further embodiment, the connection straps 725 also hide the coaxial cable 722 or other wires connecting the reader unit 719 with the antenna unit 723.

Figure 8A:
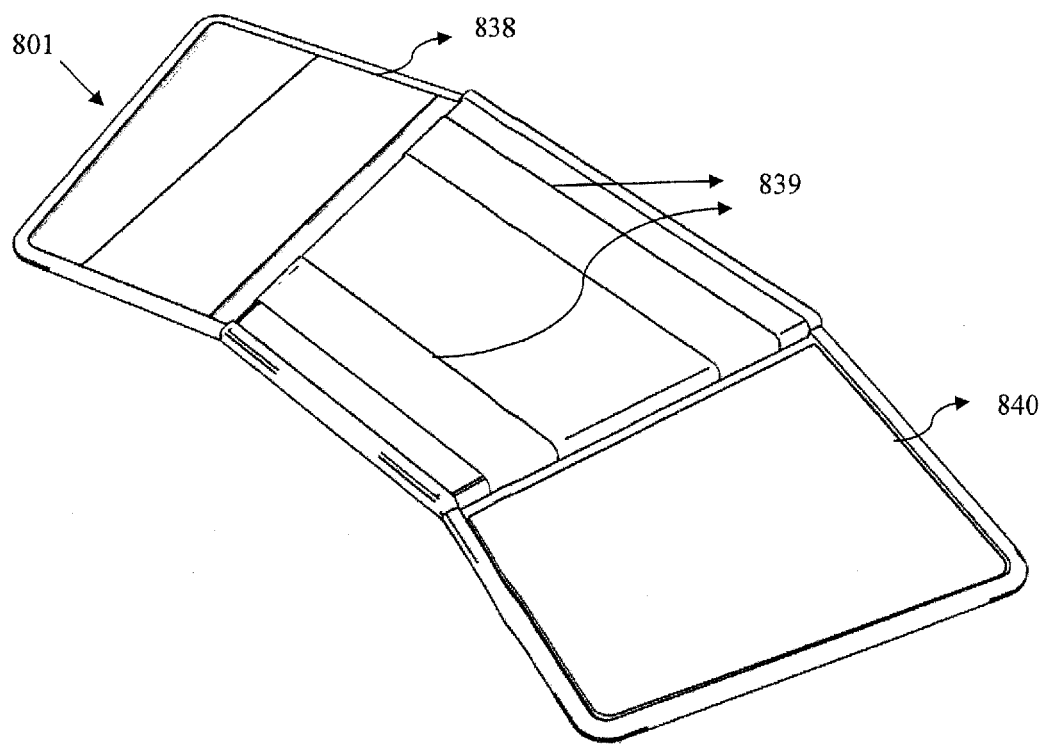
FIGS. 8a and 8b show a sleeve holder in accordance with an embodiment of the subject invention.
Figure 8B:
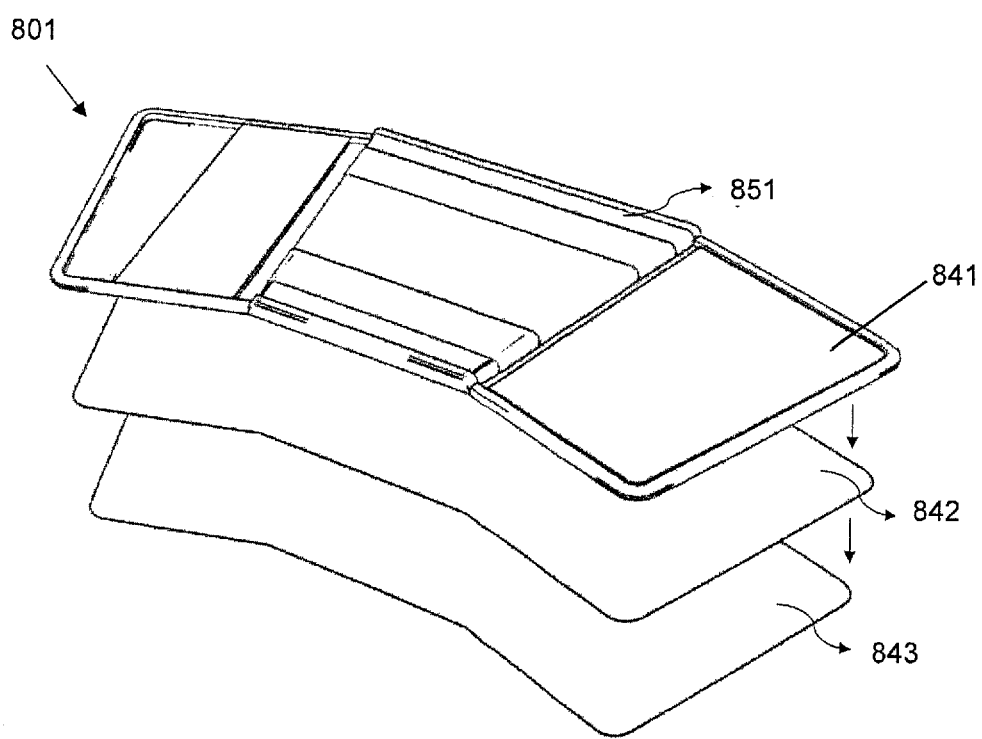

FIGS. 8a and 8b show a sleeve holder 801 for holding an RFID system such as the system 701. These figures merely depict one example of such a sleeve holder. Embodiments of the invention may contain additional elements not shown here or may not include all of the elements here presented. Those elements presented here may be differently arranged in alternative embodiments of the invention.

FIG. 8a presents a top view of the holder 801. The holder 801 contains a portion for holding an RFID reader 838, a portion for holding an antenna 839, and a portion for securing the holder to a wearer 840. In further embodiments, the holder includes portions for holding additional system components, such as a separate host system. Various fastening means known in the art may be used to secure components to the holder 801 or the holder 801 to a wearer. For example, hook and loop fasteners, synch straps, or other fastening or harness mechanisms may be employed for this purpose. The holding portions may be rigid to support a rigid component. For example, the portion shown for holding an RFID reader 838 is rigid. The holding portions may also contain placement straps such as those shown in the portion for holding an antenna 839. Such straps may be comprised of hook and loop fasteners and the antenna (or other component) may be placed at various locations along their length to accommodate different sized components, wearers, or preferred arrangements. The portion for securing the holder to a wearer 840 may also comprise fasteners arranged along a length of material so that the holder can be adjusted to accommodate wearers of various sizes. For example, the portion 840 may contain different synch strap slots or hook and loop fasteners where the holder 801 may be secured to a wearer. Fasteners may also be positioned on the underside of the holder 801 (not shown) to marry with the fasteners discussed.

FIG. 8*b* presents an exploded view of the holder 801 showing various components of the holder 801. The top layer of the sleeve 841 is composed of breathable material. In an embodiment of the invention, highly breathable and water resistant mesh fabric, such as treated Nylon or GOR-TEX, is used to repel moisture and ensure the comfort of the wearer. An intermediate layer 842 is composed of an RF shielding material. The RF shielding material is positioned to reflect or absorb antenna radiation. Various shielding materials are available and well known in the art. In an embodiment of the invention, a fabric is used which incorporates conductive strands in a grid pattern. The resulting fabric is flexible and washable. Shielding is achieved by the conductive strands which reflect electromagnetic waves. The reflection produced depends on the dielectric constant of the strand material and the gaps between each strand. In a particular embodiment, the conductive strands are incorporated into a cotton base fabric which absorbs sweat and is comfortable to wear next to the skin. In an embodiment, RF shielding material is positioned on the holder between the body of the user and the antenna. In an embodiment, RF shielding material is positioned on other parts of the user. For example, if the antenna is positioned inside the forearm of the user, RF shielding material may be placed on other body parts where RF exposure is likely to occur depending on the antenna radiation pattern, such as on the legs, pelvis, and torso of the user. In a further embodiment, the user wears coveralls which incorporate RF shielding material. In an embodiment, the user wears an undergarment (i.e., a garment worn under other clothes or a holder) which incorporates an RF shielding material. In the embodiment shown in FIG. 8*b*, a bottom layer is incorporated into the holder 801 constructed from a breathable and absorbent material such as cotton or various forms of polyester known in the art.

In an additional embodiment of the invention, insulation is also incorporated into the holder or otherwise positioned between the user and the antenna. In the embodiment shown in FIG. 8, insulation is incorporated into the holder creating a thickened portion 851 where the antenna will be attached. Such insulation reduces antenna interference from the wearer's body. In a particular embodiment of the invention, a 10 mm distance between the human body and the antenna is achieved.

In yet another embodiment, the holder is wholly disposable or incorporates a disposable layer for comfort and convenience. In yet another embodiment, all fabric, straps, accessories, and fasteners incorporated into the holder are washable. In another embodiment, the holder is made of rigid materials such as plastics, among other suitable materials.

Figure 9:
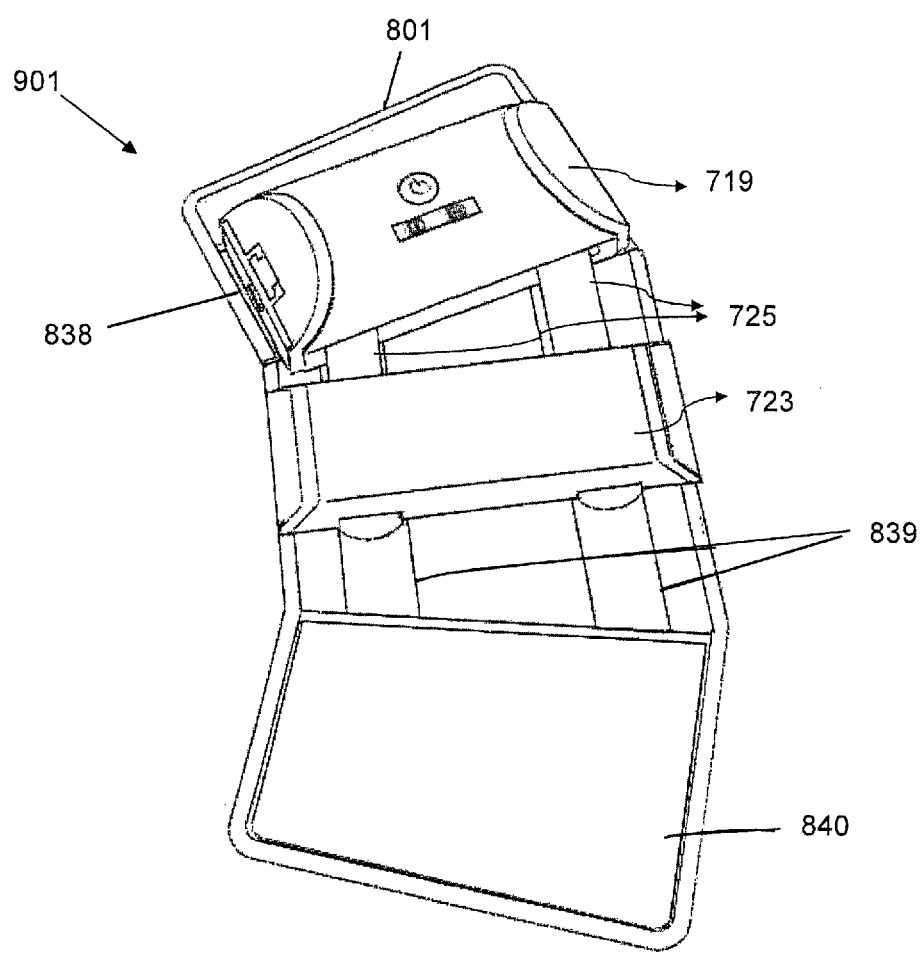
FIG. 9 shows the sleeve holder of FIG. 8a with a reader and rigid antenna positioned thereon on in accordance with an embodiment of the subject invention.

FIG. 9 shows the sleeve holder of FIG. 8 with the RFID system of FIG. 7 positioned thereon. The composition is referred to as a wearable RFID system 901. The composition 901 presented is merely an example. The sleeve holder 801 may accommodate various other RFID systems; and the RFID system 701 may be held by various other holders.

Figure 10A:
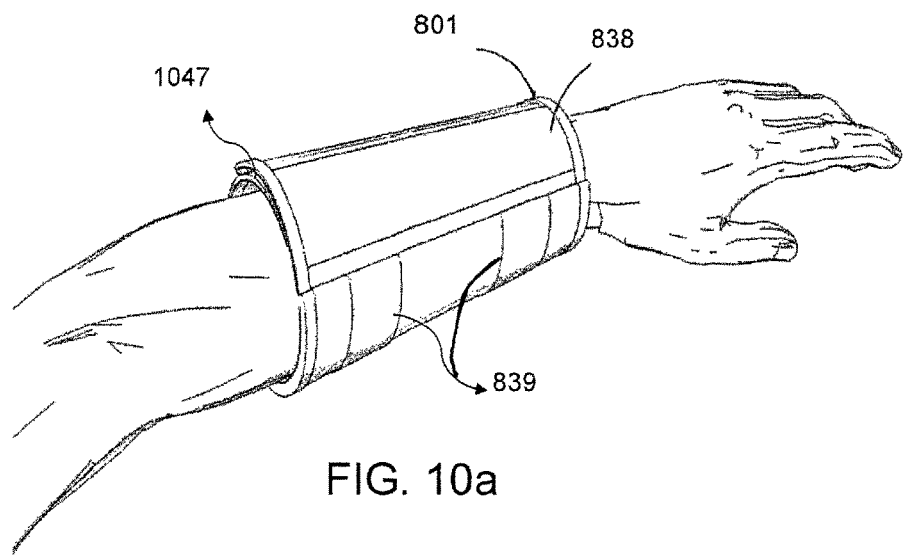
FIG. 10a shows the sleeve holder of FIG. 8a positioned on a human forearm in accordance with an embodiment of the subject invention.

FIG. 10*a* shows the sleeve holder of FIG. 8 positioned on a human forearm. As discussed above, various means may be used to secure such a holder to wearer. Here, hook and loop fasteners secure overlapping portions of the sleeve holder 801 at position 1047.

Figure 10B:
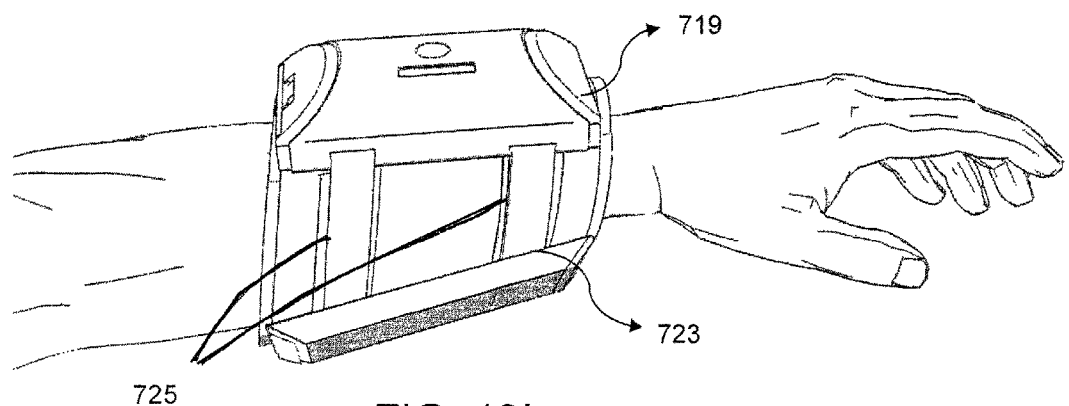
FIG. 10b shows the sleeve holder of FIG. 10a with an antenna and reader positioned thereon on in accordance with an embodiment of the subject invention.

FIG. 10*b* shows the sleeve holder of FIG. 8 with the RFID system of FIG. 7 positioned thereon. As shown, the reader unit 719 is positioned on the top of the forearm so that the various controls and status indicators can be easily viewed and accessed by the wearer. The antenna unit 723 is positioned on the inside of the forearm so that radiation from the antenna will be generally directed toward an object held by the wearer. As discussed above, the connection straps 725, which physically connect the reader unit 719 and the antenna unit 723, are composed of a flexible material to accommodate forearms of different sizes. Rubber, elastomers, or other materials known in the art may be suitable for this purpose.

In another embodiment, the antenna is placed on a holder incorporated into footwear or legwear so that antenna radiation may be directed up towards a tagged object held by the user or out towards tagged objects in front of the user. In yet another embodiment, the antenna is positioned on the torso of the user. For example, the antenna can be positioned on a holder incorporated into a shirt, jacket, vest, or other clothing item, or made part of a harness worn around the chest, neck, or shoulders. Other designs are possible and will be obvious to those skilled in the art. The examples provided herein are merely illustrative. Other holder designs can be used with the subject invention.

Figure 11:
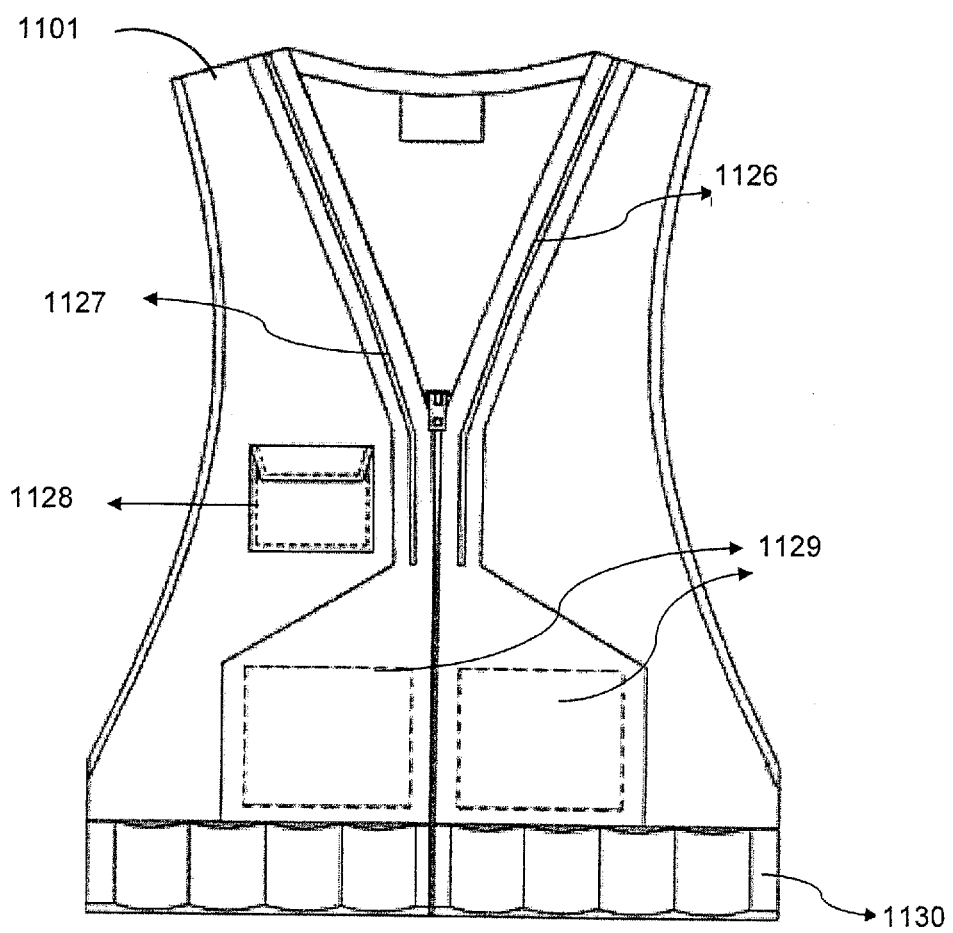
FIG. 11 shows a vest holder in accordance with an embodiment of the subject invention.

In another particular embodiment of the invention, depicted in FIG. 11, a vest holder 1101 is provided that is adapted to hold antennas and an RFID reader. As shown, the RFID reader is held in a pocket 1128. The antennas are incorporated into front panels 1129. Front panels 1129 are positioned so that radiation from the antennas will generally be directed toward an object positioned directly in front of the wearer of the vest. The antennas and reader may be permanently sewn into the vest 1101 or they may be removeably attached to the vest 1101. The vest 1101 also comprises status lights 1126 and 1127. As discussed above, such status indicators can indicate various useful pieces of information to users. A battery compartment 1130 is also included at the bottom of the vest 1101. Batteries may be removed from the compartment 1130 to be charged. In an alternative embodiment, batteries may be charged by the kinetic energy produced by the movement of the wearer of the vest 1101. The various components of the vest 1101 may be connected by wires sewn into the vest 1101 or by various other connection means known in the art.

Figure 12:
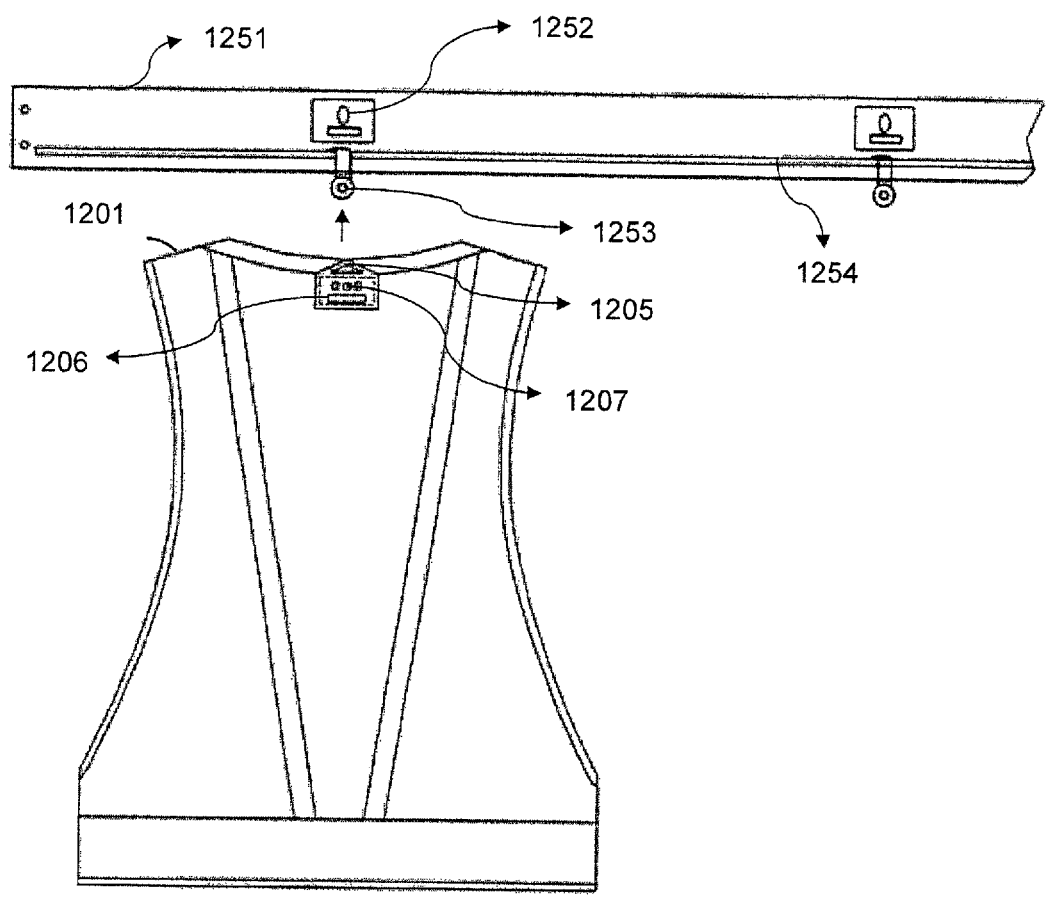
FIG. 12 shows a vest and an apparatus for storing said vest in accordance with an embodiment of the subject invention.

FIG. 12 shows a vest embodiment of a wearable RFID system 1201 and a vest storage apparatus 1251 in accordance with an embodiment of the subject invention. The vest 1201 incorporates an RFID system (not shown). In addition, the vest 1201 includes a docking unit 1205 which is used to removeably attach the vest 1201 to the storage apparatus 1251 via a hook 1253. When the docking unit 1205 is in contact with the hook 1253, power is provided to and data is downloaded from the RFID system 1201 via a network and power cable 1254. The data is downloaded to a host system on the network for further processing as discussed above. The docking unit 1205 also includes a system display and controller 1206. The system display and controller 1206 may comprise various status indicators and controls as discussed above. In a particular embodiment, the system display and controller 1206 indicates the power level of the vest. In a further embodiment, the system display and controller 1206 indicates the progress of data download is that the vest 1201 is not prematurely removed from the hook 1253. The docking unit 1205 also includes a name tag 1207 which may bear the name or initials of a worker assigned to wear the vest 1201. In embodiments, the worker must unlock the vest 1201 to remove it from the hook 1253 using a fingerprint reader 1252. The lock may also prevent removal of the vest 1201 from the hook 1253 while charging and/or data transfer is incomplete.

FIG. 13 depicts a method of using an RFID system according to an embodiment of the subject invention. In this figure, a worker wears a wearable RFID system 1301 while moving a box 1303 with an attached RFID tag 1302. The wearable RFID system 1301 may be one of the systems discussed above or a similar system. While the worker is moving the box 1303, the wearable RFID system receives signals from the RFID tag 1302 in order to obtain information about the box 1303. As discussed above, the signal information may then be communicated to a host system for use with various applications including, for example, sorting, tracking, and inventory control, among other applications. In a particular embodiment of the invention, the RFID system 1301 automatically begins scanning for signals from the RFID tag 1302 when the worker picks up or moves the box 1303. In an embodiment, the scanning occurs automatically, without the requirement of any additional intentional movement by users including any speech or other commends from the wearer or other users of the system 1301. In embodiments of the subject invention, this automation is accomplished through detection of a particular movement of an object and/or the recognition of a particular movement pattern of the object. As discussed above, various techniques can be used to detect, track, and/or measure movement of an object; and/or to determine and/or recognize a movement pattern. In an embodiment, detected motion of a system component 1301, the wearer, or the box 1303 is compared or correlated to a known movement pattern associated with picking up or moving a box such as the box 1303. The function of comparing the detected movement to the known movement pattern can be housed in a movement pattern recognition module. When the detected movement matches the pattern, scanning is initiated by the RFID system 1301.

Figure 14:
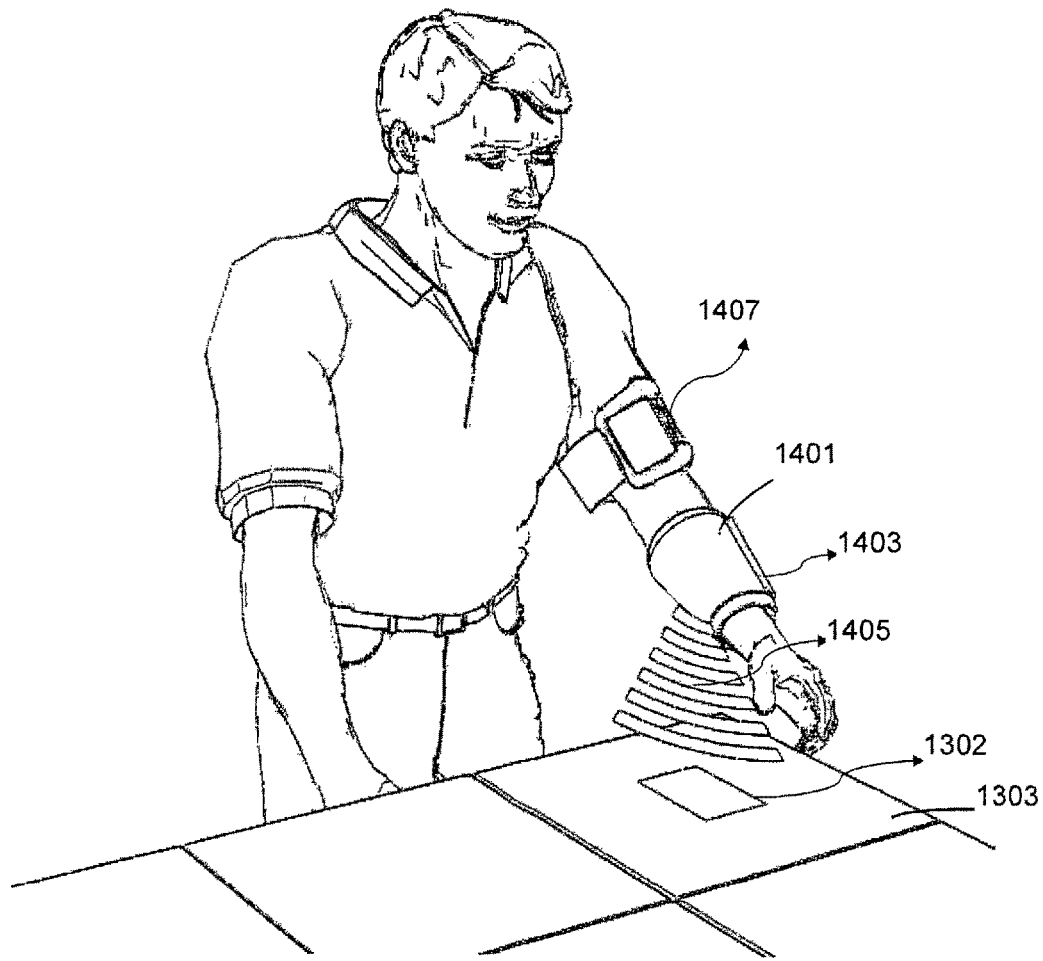
FIG. 14 depicts a method of using a further embodiment of the subject invention with a wearable host system and read triggering sensor.

FIG. 14 depicts a method of using an RFID system according to a further embodiment of the subject invention. In this Figure, a worker again wears a wearable RFID system 1401 while moving a box 1303 with an attached RFID tag 1302. But here the RFID system 1401 includes a read triggering sensor 1403. As discussed, the read triggering sensor 1403 may be triggered by various events including the motion of the worker when pickup up the box 1303. Regardless, when the sensor 1403 is triggered it sends a triggering message to the RFID system 1401 which then initiates scanning for RF signals. In a further embodiment, when the RFID system receives the triggering message it also produces an interrogating RF signal 1405. As shown, because of the placement of the RFID system 1401 and its incorporated antenna the interrogation signal 1405 is directed toward the box 1303 when the worker moves to pickup the box 1303. In a further embodiment of the invention, the RFID system 1401 employs a selection algorithm to differentiate signals received from the RFID tag 1302 attached to the box 1303 from signals produced by the other boxes in the vicinity of the box 1303. The worker shown here is also wearing a wearable host system 1407 on a separate holder. In this example, the RFID system 1401 communicates signal information to the host system 1407 for display, interaction, and/or further processing by the host system 1407.

Figure 15:
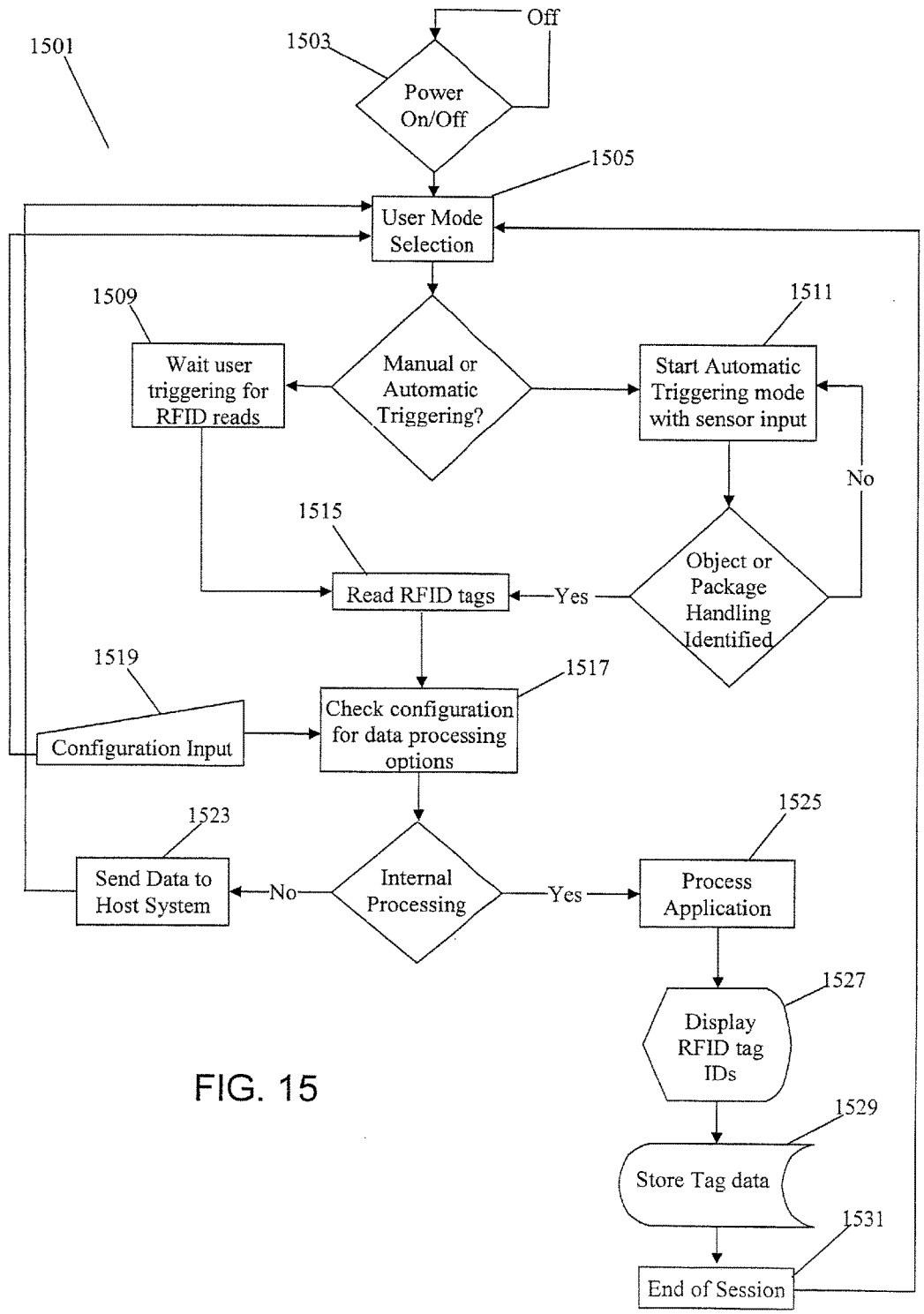
FIG. 15 shows a flow diagram of a method in accordance with an embodiment of the subject invention.

FIG. 15 shows a flow diagram of a method for reading RFID tags 1501 in accordance with an embodiment of the subject invention. According to the method 1501, an RFID system, such as one of the systems discussed above or a similar system, is first powered on at step 1503. At step 1505, a user mode selection is determined. The mode selection can be preconfigured and saved in configuration input file 1519, or the user may input the selection through a control or input device attached to the RFID system. If manual triggering mode is selected, the method proceeds to step 1509. At step 1509 the RFID system waits for a user command to begin scanning for RF signals. The user command can take various forms such as; the pushing of a button on a RFID reader or the manipulation of a similar control; a voice command or other triggering event detected by a sensor attached to the RFID reader; a message from another input device attached to the RFID reader or a host system; or another command mechanism known in the art. Once the command is received, the method proceeds to step 1515. If instead automatic triggering is indicated at step 1505, the method proceeds to step 1511. At step 1511, the RFID system utilizes sensors to determine when scanning for RF signals should commence. Various techniques may be employed to determine the appropriate time for scanning to commence. In one embodiment, a sensor is employed that recognizes the proximity of a tagged object in the vicinity of the RFID system. In another embodiment, detection of a particular movement of an object and/or the recognition of a particular movement pattern of an object is used, as discussed above. In an embodiment, when the wearer's movements match a movement pattern indicative of handling a tagged object, the pattern is recognized and the method proceeds to step 1515.

At step 1515, the RFID system scans for RF signals from tagged objects. In a further embodiment, the RFID system first transmits an interrogating RF signal which generates response signals from tagged objects. If more than one RF signal is received, a selection algorithm may be employed to select an appropriate RF signal for further processing.

At step 1517, a data processing mode configuration is determined. The mode configuration can be preconfigured and saved in configuration input file 1519, or the user may input the configuration through a control or input device attached to the RFID system. If internal processing mode is configured, the method proceeds to step 1525. Otherwise, information relating to an RF signal read in step 1515 is transmitted to an external host for further processing at step 1523, and the method returns to step 1505.

At step 1525, information relating to an RF signal read in step 1515 is passed to an internal processing function. At step 1527, information related to the RF signal is presented to a user. Such information may include a serial number or other information stored on an RFID tag which sent the signal. Such information may be presented to the user via a video display or other output device as discussed above. At step 1529, some of the information, such as the serial number of the RFID tag is stored in a database. Once the processing function is complete at step 1531, the method returns to step 1505.

Embodiments of the subject invention can be used for various applications and/or use-case scenarios. For example, embodiments of the subject invention can be used to track or process a single item; a plurality of items (e.g., item-level tracking); a container of items, such as a case, pallet, air cargo container, or other container (e.g., case-level tracking); items at particular locations; items passing through a portal; and/or items passing by a scanner, among other possibilities. Embodiments of the subject invention can be used for various applications, such as check-out, mail tracking, pharmaceutical product tracking, inventory control (e.g., library inventory, store inventory, or warehouse inventory, among others), pallet build-up or break-down, baggage handling, ticket/admission tracking (e.g., lift tickets, concert, sporting events), temperature tracking (e.g., continuous polling of temperature tracking tags), among other applications. Various variables can define different use-case scenarios for embodiments of the subject invention, such as the contents of the items, boxes, and/or containers to be tracked, including their insulating and reflective qualities (e.g., metal and/or moisture content); the insulating and reflective qualities of other materials in the proximate environment; the frequency band used; the types of RFID tags used; the dimensions of the user; among other variables.

Various system settings or configurations can be used with a system, device, or method of the subject invention for the various applications and/or use-case scenarios. In an embodiment, a system, RFID reader, or other device of the subject invention can be configured for use in various applications or use-case scenarios. For example, in an embodiment, components of the system can be positioned in different locations, orientations, or manners as discussed above. In an embodiment, different power output levels can be used with one or more antennas as discussed above. In an embodiment, different types of RFID tags can be interrogated. In an embodiment, a system, device, or method of the subject invention supports interrogation of a plurality of RFID tag types. In an embodiment, the plurality of RFID tag types includes tags complying with UHF Class 0, Class-1 Generation-2, and Class-3 standards. In an embodiment, the plurality of RFID tag types includes tags complying with Class-1 Generation-2 and Class-3 standards. In an embodiment, the plurality of RFID tag types includes tags complying with UHF Class 0 and Class-1 Generation-2 standards. In an embodiment, the plurality of RFID tag types includes tags complying with UHF Class 0 and Class-3 standards. In an embodiment, the plurality of RFID tag types includes fully-passive tags and/or battery-assisted tags. In an embodiment, the plurality of RFID tag types includes dipole and/or dual dipole tags. In an embodiment, the plurality of RFID tag types includes metal mount tags. In other embodiments, other classes or types of tags can be interrogated. In an embodiment, different RF wavelengths can be used as discussed above. In an embodiment, multiple frequency bands, such as 13.56 MHz, 915 MHz, and/or 2.4 GHz, among other bands, can be supported at the same time. In an embodiment, different read triggering schemes can be used, such as manual or automatic read triggering, as discussed above. In an embodiment, different information processing schemes can be used, such as processing of received RF signals by an internal or external host, as discussed above.

These and other settings or configurations can be established or changed in different ways. In an embodiment, a user or group of users can select a template configuration of the system or device and then customize the template for their use. In an embodiment, a user can manually adjust the settings or configuration of an RFID system on initiation of an application or user-case. In an embodiment, such settings can be set or adjusted automatically on the receipt of an event message, as discussed above. In an embodiment, a user can indicate or describe a particular intended application and/or use-case to the system. In an embodiment, the RFID system recognizes a specific application and/or use-case scenario based on a movement pattern, as discussed above. In an embodiment, the system can then set or adjust settings as appropriate for the indicated or recognized application and/or use-case. In an embodiment, no additional or specific action by the worker is required to initiate such adjustment. Therefore the worker is able to initiate and change tasks without any extraneous movement or time.

As discussed above, different settings and/or configurations are appropriate for different applications or use-case scenarios. For example, the power output level used to drive a transmitting antenna can be adjusted depending on whether the device is used for sorting or inventory as discussed above. The power output or other settings can also be adjusted based on how the system is worn or otherwise positioned on the user. In an embodiment, the power output or other settings are adjusted such that a particular subset of tags is within a read range generated by an antenna of the system during the application. In an embodiment, different settings and/or configurations can be chosen based on the height, movement patterns, or other characteristics of a user of the system. In an embodiment, the system can be augmented or upgraded to support different users, applications, and/or use-case scenarios. In an embodiment, the system can be upgraded remotely by downloading patches, drivers, or other upgrade modules from a server. Various wireless and wireline communication technologies, as discussed above, can be used to accomplish the download.

Various output power levels can be used to drive transmitting antennas for various applications and/or use case scenarios. For example, in an embodiment, a very low power level can be used for certain applications and/or use case scenarios, such as a power output of less than 12 dBm. Depending on the antenna, frequency band, and tags used, and other variables and environmental factors, such a power level can produce a read range of less than 5 centimeters. Such a read range may be useful for item-level tracking, check-out applications, a deck-top scanner, and other precise handling applications. Such a read range may be useful when only one item should be identified at a time (e.g., killing a tag).

In an embodiment, a low power level can be used for certain applications and/or use case scenarios, such as a power output of 12-18 dBm. Depending on the antenna, frequency band, and tags used, and other variables and environmental factors, such a power level can produce a read range of 5-50 centimeters. Such a read range may be useful for item-level tracking, where expected metal and moisture content is higher, or inventory tracking. Such a read range may be useful when a carried item is to be identified, depending on item size and metal and moisture content.

In an embodiment, a mid-range power level can be used for certain applications and/or use case scenarios, such as a power output of 19-22 dBm. Depending on the antenna, frequency band, and tags used, and other variables and environmental factors, such a power level can produce a read range of 50-100 centimeters. Such a read range may be useful for package handling, small container tracking, or pallet build-up or breakdown, depending on metal and moisture content.

In an embodiment, a high power level can be used for certain applications and/or use case scenarios, such as a power output of 23-27 dBm. Depending on the antenna, frequency band, and tags used, and other variables and environmental factors, such a power level can produce a read range of 1-2 meters. Such a read range may be useful for baggage handling, mid-size container tracking, or portal tracking, depending on metal and moisture content.

In an embodiment, a very high power level can be used for certain applications and/or use case scenarios, such as a power output greater than 27 dBm. Depending on the antenna, frequency band, and tags used, and other variables and environmental factors, such a power level can produce a read range of 3-4 meters. Such a read range may be useful for large container tracking or temperature tracking, depending on metal and moisture content.

The variables, factors, power levels, applications, and use-case scenarios described above are illustrative examples. Other variables, factors, power levels, applications, and use-case scenarios can be used with the subject invention.

In an embodiment of the subject invention, a device is provided, wherein the device is configured to drive a transmitting antenna at a plurality of output power levels. In an embodiment, the plurality of output power levels comprises three or more power levels. In an embodiment, each of the plurality of output power levels is defined by a power level (e.g., 22 dBm). In an embodiment, each of the plurality of output power levels is defined by a range of power levels (e.g., 10-12 dBm). In an embodiment, each range is distinct. In an embodiment, ranges within the plurality can overlap.

In an embodiment, a user can select an output power level to be used to drive the transmitting antenna from among the plurality of output power levels. In an embodiment, the user selects a specific power level. In an embodiment, the user selects a specific range of power levels. In an embodiment, the user selects or describes an application and/or use case scenario for the device and the device automatically selects a power level based on the scenario selected or described by the user.

In an embodiment, the device automatically selects or adjusts a power level or other setting based on input from at least one sensor, such as a user interface, moisture sensor, movement pattern recognition module (gyroscope; accelerometer); and/or receiving antenna. For example, in an embodiment, the device automatically adjusts an output power level used to drive the transmitting antenna based on a number of RFID tags read by a receiving antenna. In an embodiment, the transmitting antenna is also the receiving antenna. For example, in an embodiment, the device automatically increases the output power level until at least one tag is read by the receiving antenna. In an embodiment, the device automatically increases the output power level until at least two tags are read by the receiving antenna. In an embodiment, the device automatically decreases the output power level until only one tag is read by the receiving antenna. In an embodiment, the device automatically decreases the output power level until only two tags are read by the receiving antenna. In an embodiment, the device automatically increases the output power level when at least one tag is read by the receiving antenna. In an embodiment, the device automatically increases the output power level when at least two tags are read by the receiving antenna.

In another embodiment, the device automatically adjusts the output power level used to drive the transmitting antenna based on a number of times the receiving antenna reads the same RFID tag within a specified time-period. For example, in an embodiment, the device automatically decreases the output power level when the same RFID tag is read more than five times per second. In an embodiment, the threshold is 10 times per second. In an embodiment, the threshold is 50 times per second. In an embodiment, the threshold is 1 times per quarter second. The thresholds and time-periods stated here are illustrative examples. Various other read thresholds and time-periods can be used. In an embodiment, the output power level used continues to adjust during the course of the application, either automatically and/or in response to user input. Thus, different power levels can be used during different phases of the application. In an embodiment, power usage and/or battery life are conserved by adjusting the power level.

In an embodiment of the subject invention, a method of interrogating an RFID tag is provided, including: driving an interrogating RF antenna at a first power output level to produce a first interrogating RF signal; driving the interrogating RF antenna at a second power output level to produce a second interrogating RF signal, wherein upon incidence of the second interrogating RF signal on an RFID tag, the RFID tag produces a response RF signal encoded with information stored on the RFID tag; and receiving the response RF signal via a receiving RF antenna. In an embodiment, the first power output level adjusts to the second power output level upon sensor input, event recognition, and/or user interaction, as described above.

In an embodiment of the subject invention, a plurality of antennas is used with an RFID system. In an embodiment, an array of antennas is used. A device such as a multiplexer can be used to select one or more antennas of the plurality depending on the application and/or use-case. In an embodiment, a first antenna of the plurality is a transmitting antenna, and a second antenna of the plurality is a receiving antenna. In an embodiment, the first antenna can also operate as a receiving antenna. In an embodiment, the second antenna can also operate as a transmitting antenna. In an embodiment both antennas are mono-static used for both transmitting and receiving. In an embodiment, the second antenna is removeably connected to the RFID system such that the system can be used with or without the second antenna. In an embodiment, the second antenna is a handheld antenna. In an embodiment, the second antenna is a directional antenna. In an embodiment, the directional antenna can be oriented by the user to interrogate and/or receive signals from at least one specific RFID tag.

In an embodiment, the first and second antennas are each positioned or otherwise configured to interrogate and/or receive RF signals from different RFID tags. Thus, the first antenna is configured to interrogate and/or receive RF signals from a first type of RFID tags, and the second antenna is configured to interrogate and/or receive RF signals from a second type of RFID tags. For example, in an embodiment, the first antenna can be configured to interrogate and/or receive RF signals from object RFID tags attached to objects handled by the user, while the second antenna can be configured to interrogate and/or receive RF signals from location RFID tags positioned at locations passed by the user, or vice versa. In another embodiment, the second antenna can be configured to interrogate and/or receive RF signals from container RFID tags positioned on containers used to hold such objects.

In an embodiment, a single antenna is used to receive RF signals from different RFID tags. In an embodiment, the single antenna is driven in different ways to receive RF signals from different RFID tags. For example, the orientation of the antenna can be changed, the power output level used to drive the antenna can be changed, or the wavelength used can be changed, among other changes. In an embodiment, the read field of the single antenna is different for different types of RFID tags. For example, the read field can be larger for battery-assisted RFID tags than for fully-passive RFID tags.

In a particular embodiment, an RFID system can be used as a door portal scanner, but instead of setting up an RFID reader at every doorway, location RFID tags can be placed on the doorways and an antenna can be oriented to interrogate and receive a location RF signal from the RFID tags. Hence, as the user passes through the doorway, the system will scan the door tag. In an embodiment, the system can also scan an object RFID tag attached to a tagged object held by the user. The object carried by the user can then be associated with the location of the doorway by the RFID system using a read association module, as discussed above. In an embodiment, a plurality of antennas can be used with the RFID system. In an embodiment, a first antenna of the plurality can be configured to interrogate RF signals from the door tags, and a second antenna of the plurality can be configured to interrogate RF signals from the handled objects. In a particular embodiment, the first antenna is positioned on the outside of the user's arm, and the second antenna is positioned on the inside of the user's arm. In other embodiments, the location tags can be positioned at other locations, such as a ceiling, palette, or other location. In an embodiment, the object tags can be positioned on the objects in various ways as known in the art. The first and second antennas can be configured in various ways to facilitate interrogating or reading these tags. In an embodiment, as discussed above, a single antenna is used but it is oriented or driven to receive the RF signals from the different RFID tags.

In another embodiment, an RFID system can be used to associate objects with containers, but instead of setting up an RFID reader at every container, container RFID tags can be placed on the containers and an antenna can be oriented to interrogate and receive a container RF signal from the RFID tags. Hence, as the user moves an object in to, out of, or near a container, the system will scan the container tag. In an embodiment, the system can also scan an object RFID tag attached to the object held by the user. The object carried by the user can then be associated with the container by the RFID system using a read association module, as discussed above. In an embodiment, a plurality of antennas can be used with the RFID system. In an embodiment, a first antenna of the plurality can be configured to interrogate RF signals from the container tags, and a second antenna of the plurality can be configured to interrogate RF signals from the handled objects. Depending on the application, use-case, container configuration, and other variables, various system settings and configurations can be set or adjusted, as discussed above. In a particular embodiment, the first antenna is positioned on the outside of the user's arm, and the second antenna is positioned on the inside of the user's arm. In an embodiment, at least one container tag is positioned on at least one surface of the container. In an embodiment, a plurality of container tags is positioned on the container. In an embodiment, tags are positioned on a plurality of surfaces of the container. In an embodiment, tags are positioned on interior surfaces of the container such that tags are only read when a RFID reader or antenna of the system is located inside the container. Thus, tags can be read when the user places an item inside the container or removes an item from the container. In an embodiment, the object tags can be positioned on the objects in various ways as known in the art. The first and second antennas can be configured in various ways to facilitate interrogating or reading these tags. In an embodiment, as discussed above, a single antenna is used but it is oriented or driven to receive the RF signals from the different RFID tags.

Figure 16A:
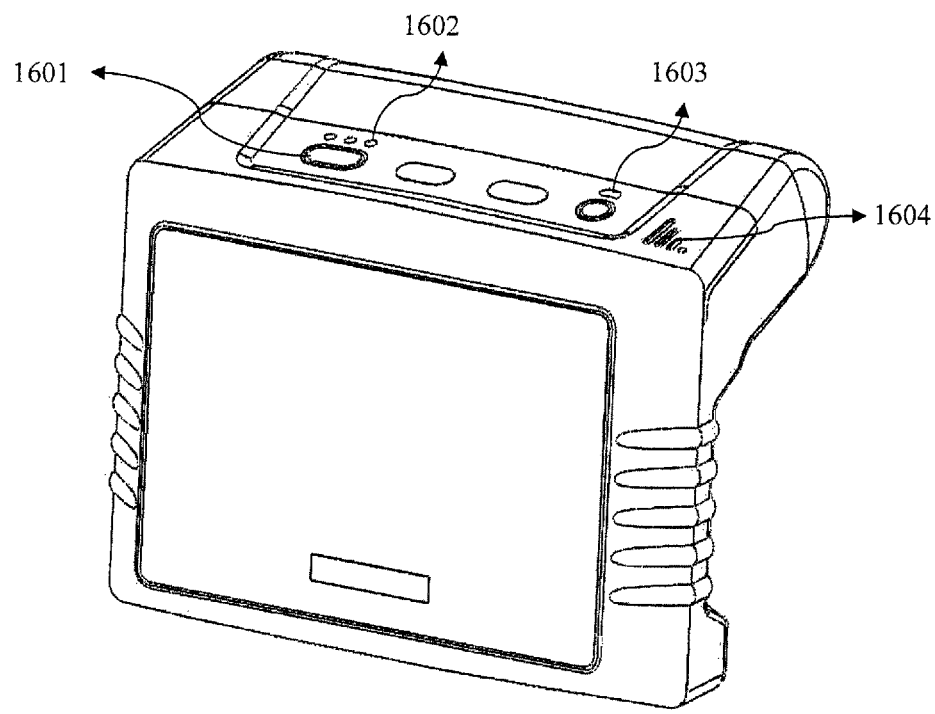
FIGS. 16a and 16b show a wearable RFID reader configured for voice command and power output adjustment in accordance with an embodiment of the subject invention.
Figure 16B:
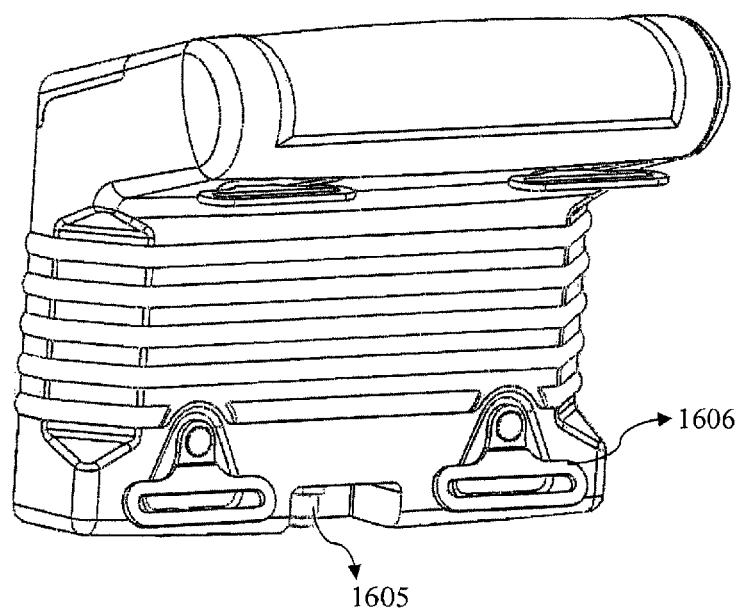

FIGS. 16a and 16b show a wearable RFID system configured for voice command and power level adjustment in accordance with an embodiment of the subject invention. The embodiment shown includes a power output button 1601, which allows a user to select a particular power output level to be used with the RFID system. As discussed above, various power output levels are appropriate for various applications of the wearable RFID system. In an embodiment, the user directly selects the power level via the button 1601. In an embodiment, the user indicates the intended application via the output button 1601 and the system selects an appropriate power level as discussed above. In an embodiment, a different type of control or sensor is used as discussed above.

The embodiment shown also includes an external antenna port 1605. As discussed above, an antenna can be communicably connected to the system via such a port. In an embodiment, a first antenna is connected into a housing of the system and a second antenna can be connected via the port 1605. Thus, the second antenna can be used when not in use. In an embodiment, the second antenna is communicably attached via the port 1605 for various applications or use-case scenarios. In an embodiment, the system recognizes the attachment and sets or adjusts the system configuration based on the attachment.

The embodiment shown also includes a read indicator 1602. As discussed above the read indicator can take various forms. Here, a series of lights is used. The embodiment shown also includes a battery power indicator 1603, which indicates the level of battery power available for use by the system. Various methods of indicating battery power level are known in the art and can be used with the subject invention. Here, a light is used that changes color or flashes when the level is getting low. A microphone for voice commands and a speaker for voice alerts 1604. As discussed above, voice commands and alerts can be used to provide various inputs and outputs to the RFID system. The embodiment shown also includes buckles 1606. Such buckles or other attachment means can be used to attach a system component to the system or the system to a harness, as discussed above. The embodiment shown here is merely an illustrative example. Other embodiments can include other features as discussed above.

Many different arrangements of the various components depicted, as well as components not shown, are possible without departing from the spirit and scope of the present invention. Embodiments of the present invention have been described with the intent to be illustrative rather than restrictive. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need be carried out in the specific order described.

EMBODIMENTS

Embodiment 1

A radio frequency identification (RFID) system, comprising:
an RFID reader;
a transmitting antenna capable of transmitting an interrogating radio frequency (RF) signal when driven by the RFID reader;
a sensor, wherein the sensor senses a change in a physical environment and generates sensor information;
an event recognition module, wherein the event recognition module processes the sensor information to recognize a triggering event, wherein when the event recognition module recognizes the triggering event, a trigger event message is transmitted to the RFID reader, wherein upon receipt of the trigger event message the RFID reader drives the transmitting antenna to transmit the interrogating RF signal, wherein upon incidence of the interrogating RF signal on an RFID tag, a response RF signal is produced; and
a receiving antenna, wherein the receiving antenna receives the response RF signal, wherein the RFID reader receives the response RF signal from the receiving antenna.

Embodiment 2

The system of Embodiment 1, wherein the transmitting antenna is the receiving antenna.

Embodiment 3

The system of Embodiment 1, wherein the event recognition module transmits the trigger event message to the RFID reader via a wireless or a wired interface.

Embodiment 4

The system of Embodiment 1, wherein the event recognition module transmits the trigger event message to the RFID reader via a backplane.

Embodiment 5

The system of Embodiment 1, wherein the event recognition module also processes the sensor information to recognize an application event, wherein when the event recognition module recognizes the application event, an application event message is transmitted to the RFID reader, wherein upon receipt of the application event message the RFID reader causes an adjustment of at least one system setting.

Embodiment 6

The system of Embodiment 5, wherein the at least one system setting comprises a power output level used to drive the transmitting antenna.

Embodiment 7

The system of Embodiment 5, wherein the at least one system setting comprises a band used to transmit the interrogating RF signal.

Embodiment 8

The system of Embodiment 1, wherein the sensor comprises a user input interface and the triggering event comprises receiving certain input via the user input interface.

Embodiment 9

The system of Embodiment 8, wherein the certain input comprises actuation of a control on the user input interface.

Embodiment 10

The system of Embodiment 8, wherein the certain input comprises a voice command.

Embodiment 11

The system of Embodiment 1, wherein the change in the physical environment is selected from a group consisting of: a change in temperature; a change in humidity; a change in lighting; a change in acidity; a change in proximity of an object to a part of the system; a movement of an object; and a movement of a user.

Embodiment 12

The system of Embodiment 11, wherein the sensor is removeably attached to a user and the triggering event comprises a movement of the sensor.

Embodiment 13

The system of Embodiment 12, wherein the sensor comprises an accelerometer and the triggering event comprises an acceleration of the sensor.

Embodiment 14

The system of Embodiment 12, wherein the sensor comprises a gyroscope and the triggering event comprises a change in orientation of the sensor.

Embodiment 15

The system of Embodiment 12, wherein the event recognition module comprises a movement pattern recognition module that processes the sensor information to recognize a movement pattern of the user indicative of the user moving an object, wherein when the movement pattern recognition module recognizes the movement pattern of the user indicative of the user moving the object, the trigger event message is transmitted to the RFID reader.

Embodiment 16

The system of Embodiment 15, wherein the movement pattern is determined during a training period wherein the movement pattern is indicated by a human being, and the movement pattern is recognized by comparing the movement of the sensor to the movement pattern.

Embodiment 17

The system of Embodiment 15, wherein the movement pattern is indicated by the user during the training period.

Embodiment 18

The system of Embodiment 15, wherein the movement pattern recognition module processes the sensor information to recognize a movement pattern of the user indicative of picking up, carrying, and/or putting down the object, wherein when the movement pattern recognition module recognizes the movement pattern of the user indicative of picking up, carrying, and/or putting down the object, the trigger event message is transmitted to the RFID reader.

Embodiment 19

The system of Embodiment 15, wherein the RFID tag is attached to the object and the receiving antenna is removeably attached to the user during receipt of the response RF signal.

Embodiment 20

The system of Embodiment 19, wherein the RFID reader is removeably attached to the user during receipt of the response RF signal.

Embodiment 21

The system of Embodiment 19, further comprising a holder adapted to be removeably attached to the user and hold the receiving antenna during receipt of the response RF signal.

Embodiment 22

The system of Embodiment 21, wherein the holder is also adapted to hold the RFID reader during receipt of the response RF signal.

Embodiment 23

The system of Embodiment 22, wherein the receiving antenna and the RFID reader are removeably attached to the holder.

Embodiment 24

The system of Embodiment 21, wherein the receiving antenna is flexible to conform to a shape of the user where the holder is attached.

Embodiment 25

The system of Embodiment 21, wherein the holder is also adapted to hold the transmitting antenna during transmission of the interrogating RF signal.

Embodiment 26

The system of Embodiment 25, wherein the holder comprises an RF shielding material positioned to reduce the amount of radiation to which the user is exposed during transmission of the interrogating RF signal and/or receipt of the RF signal.

Embodiment 27

The system of Embodiment 26, wherein the holder further comprises an insulating material positioned between the RF shielding material and the transmitting antenna when the transmitting antenna is attached to the holder.

Embodiment 28

The system of Embodiment 21, wherein the holder comprises a sleeve adapted to be removeably attached to an arm of the user and the receiving antenna is attached to the sleeve such that, when the sleeve is removeably attached to the arm, the receiving antenna is positioned along the inside of the arm.

Embodiment 29

The system of Embodiment 15, wherein the response RF signal is encoded with signal information and a processing unit receives the response RF signal and decodes the response RF signal to obtain the signal information.

Embodiment 30

The system of Embodiment 29, wherein the signal information is stored on the RFID tag.

Embodiment 31

The system of Embodiment 29, wherein the system further comprises a host system comprising a memory, and the host system identifies the object in the memory based on the signal information obtained from the response RF signal and loads more information about the object from the memory.

Embodiment 32

The system of Embodiment 31, wherein the host system further comprises an output interface, wherein the output interface is configured to present at least some of the more information about the object.

Embodiment 33

The system of Embodiment 31, wherein the RFID reader comprises the processing unit and the RFID reader transmits the signal information to the host system via a wireless interface, a wired interface, or a backplane.

Embodiment 34

The system of Embodiment 31, wherein the host system comprises the processing unit and the RFID reader transmits the response RF signal to the host system via a wireless interface, a wired interface, or a backplane.

Embodiment 35

The system of Embodiment 31, wherein the movement pattern recognition module also processes the sensor information to recognize a movement pattern of the user indicative of use of the system for a particular application, wherein when the movement pattern recognition module recognizes the movement pattern of the user indicative of use of the system for the particular application, an application event message is transmitted to the host system, wherein upon receipt of the application event message the host system causes an adjustment of at least one system setting.

Embodiment 36

The system of Embodiment 35, wherein the at least one system setting comprises a power output level used to drive the transmitting antenna.

Embodiment 37

The system of Embodiment 35, further comprising an additional antenna, wherein the additional antenna transmits an additional interrogating RF signal, wherein upon incidence of the additional interrogating RF signal on an additional RFID tag, an additional response RF signal is produced encoded with additional signal information, the additional antenna receives the additional response RF signal and transmits the additional response RF signal to the RFID reader, the processing unit receives the additional response RF signal and decodes the additional response RF signal to obtain the additional signal information.

Embodiment 38

The system of Embodiment 37, wherein the additional antenna is removeably attached to the user during transmission of the additional interrogating RF signal and receipt of the additional response RF signal.

Embodiment 39

The system of Embodiment 38, wherein the host system further comprises a read association module, wherein when the read association module recognizes that the response RF signal and the additional response RF signal are associated.

Embodiment 40

The system of Embodiment 31, further comprising:
an additional RFID reader;
an additional antenna, wherein the additional antenna transmits an additional interrogating RF signal, wherein upon incidence of the additional interrogating RF signal on an additional RFID tag, an additional response RF signal is produced encoded with additional signal information, the additional antenna receives the additional response RF signal and transmits the additional response RF signal to the additional RFID reader, the processing unit receives the additional response RF signal and decodes the additional response RF signal to obtain the additional signal information; and
a read association module, wherein when the read association module recognizes that the response RF signal and the additional response RF signal were received by the RFID reader and the additional RFID reader, respectively, within a certain time period of each other, the read association module associates the signal information with the additional signal information in the memory.

Embodiment 41

The system of Embodiment 1, wherein the transmitting antenna and the RFID reader are configured to transmit RF signals in a plurality of bands, wherein the plurality of bands comprises at least two of the bands selected from the group consisting of: Ultra High Frequency (UHF); High Frequency (HF); Low Frequency (LF); and Microwave.

Embodiment 42

The system of Embodiment 41, wherein the receiving antenna and the RFID reader are configured to receive RF signals in the plurality of bands.

Embodiment 43

The system of Embodiment 42, wherein the receiving antenna and the RFID reader are configured to receive RF signals from a plurality of RFID tag types, wherein the plurality of RFID tag types comprises tags complying with at least two of the standards selected from the group consisting of: UHF Class 0; UHF Class-1 Generation-2; and UHF Class 3.

Embodiment 44

A method of identifying an object when the object is moved by a user, comprising:
providing a host system comprising a processing unit and a memory;
driving a transmitting antenna to transmit an interrogating RF signal, wherein upon incidence of the interrogating RF signal on an RFID tag attached to an object, a response RF signal is produced, wherein the response RF signal is encoded with signal information;
positioning an RFID system on a user, wherein the RFID system comprises:
a receiving antenna that receives the response RF signal; and
an RFID reader that receives the response RF signal from the receiving antenna and transmits the response RF signal to the host system; and
having the user move the object,
wherein the transmitting antenna is driven to transmit the interrogating RF signal automatically, and independent of any additional intentional movement by the user, when the user moves the object,
wherein the host system receives the response RF signal, the processing unit decodes the response RF signal to obtain the signal information, and the host system identifies the object in the memory based on the signal information obtained from the response RF signal.

Embodiment 45

The method of Embodiment 44, wherein the transmitting antenna is the receiving antenna.

Embodiment 46

The method of Embodiment 45, wherein the RFID reader drives the transmitting antenna to transmit the interrogating RF signal.

Embodiment 47

The method of Embodiment 46, further comprising:
providing a sensor that senses a change in a physical environment and generates sensor information;
providing an event recognition module, wherein the event recognition module processes the sensor information to recognize a triggering event, wherein when the event recognition module recognizes the triggering event, a trigger event message is transmitted to the RFID reader, wherein upon receipt of the trigger event message the RFID reader drives the transmitting antenna to transmit the interrogating RF signal.

Embodiment 48

The method of Embodiment 47, further comprising positioning an RF shielding material on the user between the transmitting antenna and the user.

Embodiment 49

One or more computer-readable media having computer-useable instructions embodied thereon for performing a method of interrogating an RFID tag, the method comprising:
determining that a triggering event has occurred;
driving a transmitting antenna to transmit an interrogating RF signal, wherein upon incidence of the interrogating RF signal on an RFID tag, a response RF signal is produced; and
receiving via a receiving antenna the response RF signal.

Embodiment 50

The media of Embodiment 49, wherein the triggering event comprises movement of an object and the movement of the object is sensed using one or more sensors.

Embodiment 51

The media of Embodiment 50, wherein:
the RFID tag is attached to the object;
wherein the response RF signal is encoded with signal information; and
the method further comprises transmitting the signal information to a host system to obtain information about the object.

Embodiment 52

The media of Embodiment 51, wherein the triggering event comprises recognition of a movement pattern indicative of a user moving the object.

Embodiment 53

The media of Embodiment 52, wherein the indicative movement pattern is determined during a training period wherein the movement pattern is indicated by a human being, and the movement pattern is recognized by comparing the movement of the object to the movement pattern.

Embodiment 54

The media of Embodiment 53, wherein the movement pattern is indicated by the user during the training period.

Embodiment 55

The media of Embodiment 51, wherein sensing that the object has been moved further comprises selecting the RFID tag attached to the object from a plurality of RFID tags within a read range of the receiving antenna.

Embodiment 56

The media of Embodiment 55, wherein the RFID tag is selected based on the RFID tag's proximity to the transmitting antenna and/or the receiving antenna.

Embodiment 57

The method of Embodiment 55, wherein the RFID tag is selected based on the RFID tag's orientation in relation to the transmitting antenna and/or the receiving antenna.

Embodiment 58

A method of interrogating one or more RFID tags, comprising:
driving a transmitting antenna at a first power level to transmit a first interrogating RF signal, wherein upon incidence of the first interrogating RF signal on zero or more of a set of RFID tags, a corresponding zero or more first response RF signals are produced;
receiving at least zero of the zero or more first response RF signals via a receiving RF antenna within a certain time period;
choosing a second power level to be used to drive the transmitting antenna based on the at least zero of the zero or more first response RF signals received within the certain time period;
driving the transmitting antenna at the second power level to transmit a second interrogating RF signal, wherein upon incidence of the second interrogating RF signal on one or more of the set of RFID tags, a corresponding one or more second response RF signals are produced; and
receiving at least one of the one or more second response RF signals via the receiving RF antenna.

Embodiment 59

The method of Embodiment 58, wherein the second power level is chosen to be higher than the first power level because a count of the at least zero of the zero or more first response RF signals received within the certain time period is too low.

Embodiment 60

The method of Embodiment 58, wherein the second power level is chosen to be lower than the first power level because a count of the at least zero of the zero or more first response RF signals received within the certain time period is too high.

Embodiment 61

A method of interrogating a plurality of RFID tags, comprising:
transmitting a first interrogating RF signal, wherein upon incidence of the first interrogating RF signal on a first RFID tag, a first response RF signal is produced;
receiving the first response RF signal, wherein the first response RF signal is encoded with first signal information;

transmitting a second interrogating RF signal, wherein upon incidence of the second interrogating RF signal on a second RFID tag, a second response RF signal is produced;

receiving the second response RE signal, wherein the second response RF signal is encoded with second signal information;

determining that the first response RF signal and the second response RF signal were received within a certain time period of each other; associating the first signal information with the second signal information.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A radio frequency identification (RFID) system, comprising:
    an RFID reader;
    a transmitting antenna,
    wherein the transmitting antenna transmits an interrogating radio frequency (RF) signal when driven by the RFID reader, and
    wherein upon incidence of the interrogating RF signal on an RFID tag, a response RF signal is produced;
    a receiving antenna,
    wherein the receiving antenna receives the response RF signal, and
    wherein the RFID reader receives the response RF signal from the receiving antenna;
    a sensor,
    wherein the sensor generates a sensor signal, and
    wherein the sensor signal has a corresponding sensor information;
    an event recognition module,
    wherein the event recognition module processes the sensor signal to recognize a triggering event,
    wherein the system is configured such that at least a portion of the system is worn by a user such that the sensor is positioned with respect to a portion of the user such that when the portion of the user moves the sensor moves,
    wherein the event recognition module is configured to recognize the triggering event based on the sensor information from the sensor signal indicating movement of the portion of the user,
    wherein when the event recognition module recognizes the triggering event, a trigger event message is transmitted to the RFID reader, wherein upon receipt of the trigger event message the RFID reader drives the transmitting antenna to transmit the interrogating RF signal,
    wherein the event recognition module comprises a movement pattern recognition module that processes the sensor information to recognize a movement pattern of the user indicative of the user moving an object having the RFID tag attached to the object,
    wherein when the movement pattern recognition module recognizes the movement pattern of the user indicative of the user moving the object having the RFID tag attached to the object, the event recognition module recognizes the triggering event and the trigger event message is transmitted to the RFID reader and the RFID reader drives the transmitting antenna to transmit the interrogating RF signal,
    wherein upon incidence of the interrogating RF signal on the RFID tag attached to the object, the response RF signal is produced, and
    wherein the response RF signal has signal information allowing the object having the RFID tag attached to be identified.

2. The system of claim 1,
    wherein the sensor is removeably attached to a user and the sensor information comprises information with respect to a movement of the sensor.

3. The system of claim 2,
    wherein the sensor comprises an accelerometer and the sensor information comprises information with respect to an acceleration of the sensor.

4. The system of claim 2,
    wherein the sensor comprises a gyroscope and the sensor information comprises information with respect to a change in orientation of the sensor.

5. The system of claim 1,
    wherein the movement pattern is determined during a training period, and
    wherein the movement pattern is indicated by a human being, and the movement pattern is recognized by comparing the movement of the sensor to the movement pattern.

6. A method of radio frequency identification (RFID), comprising:
    providing a radio frequency identification (RFID) system according to claim 1;
    having a user wear the at least a portion of the system such that the sensor is positioned the sensor with respect to a portion of a user such that when the portion of the user moves the sensor moves; and
    moving the portion of the user,
    wherein the transmitting antenna transmits an interrogating radio frequency (RF) signal when driven by the RFID reader,
    wherein upon incidence of the interrogating RF signal on an RFID tag, a response RF signal is produced,
    wherein the receiving antenna receives the response RF signal,
    wherein the RFID reader receives the response RF signal from the receiving antenna;
    wherein the sensor generates the sensor signal,
    wherein the sensor signal has the corresponding sensor information,
    wherein the event recognition module processes the sensor signal to recognize the triggering event,
    wherein the event recognition module recognizes the triggering event based on the sensor information from the sensor signal indicating movement of the portion of the user,
    wherein the event recognition module comprises a movement pattern recognition module that processes the sensor information to recognize a movement pattern of the user indicative of the user moving an object with the RFID tag attached to the object,
    wherein when the movement pattern recognition module recognizes the movement pattern of the user indicative of the user moving the object with the RFID tag attached to the object, the event recognition module recognizes the triggering event and the trigger event message is transmitted to the RFID reader and the RFID reader drives the transmitting antenna to transmit the interrogating RF signal, wherein when the event recognition module recognizes the triggering event the trigger event message is transmitted to the RFID reader, and wherein upon receipt of the trigger event message the RFID reader drives the transmitting antenna to transmit the interrogating RF signal, wherein upon incidence of the interrogating RF signal on the RFID tag attached to the object, the response RF signal is produced, and wherein the response RF signal has signal information allowing the object having the RFID tag attached to be identified.

7. The system of claim 1, wherein the receiving antenna is removeably attached to the user during receipt of the response RF signal.

8. The system of claim 7, wherein the RFID reader is removeably attached to the user during receipt of the response RF signal.

9. The system of claim 7, further comprising:

a holder adapted to be removeably attached to the user and hold the receiving antenna during receipt of the response RF signal.

10. The system of claim 9, wherein the holder is also adapted to hold the RFID reader during receipt of the response RF signal.

11. The system of claim 10, wherein the receiving antenna and the RFID reader are removeably attached to the holder.

12. The system of claim 9, wherein the holder is also adapted to hold the transmitting antenna during transmission of the interrogating RF signal.

13. The system of claim 9, wherein the holder comprises a sleeve adapted to be removeably attached to an arm of the user and the receiving antenna is attached to the sleeve such that, when the sleeve is removeably attached to the arm, the receiving antenna is positioned along the inside of the arm.

14. The system of claim 1, wherein the response RF signal is encoded with signal information and a processing unit receives the response RF signal and decodes the response RF signal to obtain the signal information.

15. The system of claim 14, wherein the signal information is stored on the RFID tag.

16. One or more non-transitory computer-readable media having computer-useable instructions embodied thereon for performing a method of identifying an object when the object is moved by a user, the method comprising:

providing a host system wherein the host system comprises:
a processing unit and a memory;
at least one sensor,
wherein the at least one sensor generates sensor information; and
an event recognition module,
wherein the event recognition module processes the sensor information to recognize whether a user moves an object having an RFID tag attached to the object;

providing a transmitting antenna to transmit an interrogating RF signal, wherein upon incidence of the interrogating RF signal on the RFID tag attached to the object, a response RF signal is produced, and wherein the response RF signal is encoded with signal information;

positioning an RFID system on a user, wherein the RFID system comprises:
a receiving antenna that receives the response RF signal; and
an RFID reader that receives the response RF signal from the receiving antenna and transmits the response RF signal to the host system; and having the user move the object with the RFID tag attached to the object, wherein when the event recognition module recognizes the user moved the object with the RFID tag attached to the object, a trigger event message is transmitted to the RFID reader, wherein upon receipt of the trigger event message the RFID reader drives the transmitting antenna to transmit the interrogating RF signal automatically, and wherein the host system receives the response RF signal, the processing unit decodes the response RF signal to obtain the signal information, and the host system identifies the object with the RFID tag attached to the object in the memory based on the signal information obtained from the response RF signal.

17. The one or more non-transitory computer-readable media according to claim 16, wherein the event recognition module comprises a movement pattern recognition module that processes the sensor information to recognize a movement pattern of the user indicative of the user moving an object, and wherein when the movement pattern recognition module recognizes the movement pattern of the user indicative of the user moving the object, the trigger event message is transmitted to the RFID reader.

18. One or more non-transitory computer-readable media having computer-useable instructions embodied thereon for performing a method of interrogating an RFID tag, the method comprising:

determining that a triggering event has occurred, wherein determining that the triggering event has occurred comprises processing sensor information from two or more sensors, wherein the two or more sensors sense movement of a user, and wherein determining that the triggering event has occurred comprises processing sensor information from two or more sensors to recognize a movement pattern of the user indicative of the user moving an object having an RFID tag attached to the object; and upon determining that the triggering event has occurred, driving a transmitting antenna to transmit an interrogating RF signal, wherein upon incidence of the interrogating RF signal on the RFID tag attached to the object, a response RF signal is produced; and receiving via a receiving antenna the response RF signal.

19. One or more non-transitory computer-readable media having computer-useable instructions embodied thereon for performing a method of interrogating a plurality of RFID tags, the method comprising:

transmitting a first interrogating RF signal, wherein upon incidence of the first interrogating RF signal on a first RFID tag, a first response RF signal is produced;

receiving the first response RF signal, wherein the first response RF signal is encoded with first signal information;

transmitting a second interrogating RF signal with a certain period of the first interrogating RF signal, wherein upon incidence of the second interrogating RF signal on a second RFID tag, a second response RF signal is produced, wherein the second RFID tag is different than the first RFID tag;

receiving the second response RF signal, wherein the second response RF signal is encoded with second signal information;

determining that the first response RF signal and the second response RF signal were received within the certain time period of each other; and upon determining that the first response RF signal and the second response RF signal were received within the certain time period of each other associating the first signal information with the second signal information.

20. The one or more non-transitory computer-readable media according to claim 19, wherein the certain time period is a predetermined time that is determined prior to receiving the first response RF signal and prior to receiving the second response RF signal, wherein the processor determines that the first response RF signal and the second response RF signal were received within the certain time period of each other by determining a separation period between receiving the first response RF signal and receiving the second response RF signal, and determining that the first response RF signal and the second response RF signal were received within the certain time period of each other if the separation time period is less than the certain time period, and wherein the processor associates the first signal information with the second signal information by associating the first signal information with the second signal information only if the first response RF signal and the second response RF signal were received within the certain time period of each other.

* * * * *